United States Patent
Shin et al.

(10) Patent No.: US 12,506,727 B2
(45) Date of Patent: Dec. 23, 2025

(54) IMAGE DISPLAY APPARATUS, MOBILE TERMINAL, AND IMAGE SYSTEM INCLUDING THE SAME

(71) Applicant: LG ELECTRONICS INC., Seoul (KR)

(72) Inventors: Byounghyun Shin, Seoul (KR); Eunjung Lee, Seoul (KR); Kyungnam Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 18/527,001

(22) Filed: Dec. 1, 2023

(65) Prior Publication Data

US 2024/0372848 A1 Nov. 7, 2024

(30) Foreign Application Priority Data

May 4, 2023 (KR) .................. 10-2023-0058415

(51) Int. Cl.
*H04L 9/40* (2022.01)
*G06F 3/14* (2006.01)

(52) U.S. Cl.
CPC ............ *H04L 63/0823* (2013.01); *G06F 3/14* (2013.01); *H04L 63/061* (2013.01)

(58) Field of Classification Search
CPC ...... H04L 63/0823; H04L 63/061; G06F 3/14
USPC ....................................................... 713/156
See application file for complete search history.

(56) References Cited

U.S. PATENT DOCUMENTS

| | | | |
|---|---|---|---|
| 7,925,027 B2* | 4/2011 | Kempf | H04L 61/00 380/30 |
| 9,589,397 B1* | 3/2017 | Christopher | H04W 12/06 |
| 11,997,219 B1* | 5/2024 | Russell | H04L 9/3268 |
| 2003/0063749 A1* | 4/2003 | Revel | G06F 21/608 380/270 |
| 2005/0130627 A1* | 6/2005 | Calmels | H04W 12/50 455/411 |
| 2015/0379286 A1* | 12/2015 | Nordback | H04L 9/0872 713/165 |
| 2016/0149710 A1* | 5/2016 | Huxham | H04L 9/3263 713/175 |
| 2018/0262907 A1* | 9/2018 | Alanis | H04W 12/64 |

(Continued)

FOREIGN PATENT DOCUMENTS

KR 1020130049266 5/2013
KR 1020190108888 9/2019

*Primary Examiner* — Thanh T Le
(74) *Attorney, Agent, or Firm* — LEE, HONG, DEGERMAN, KANG & WAIMEY

(57) ABSTRACT

The present disclosure relates to an image display apparatus, a mobile terminal, and an image system including the same. An image display apparatus according to one embodiment of the present disclosure includes: a display; a signal processing device configured to output an image signal to the display; and an interface configured to exchange data with a mobile terminal or a server, in which the interface receives a connection request and a network address of the mobile terminal from the mobile terminal, and the signal processing device is configured to generate a certificate and a security key based on the network address of the mobile terminal, and transmit the generated certificate and security key to the mobile terminal. Therefore, the certificate may be dynamically generated.

19 Claims, 29 Drawing Sheets

(56) References Cited

U.S. PATENT DOCUMENTS

| | | | |
|---|---|---|---|
| 2018/0332471 A1* | 11/2018 | Zhu | H04L 63/061 |
| 2019/0014114 A1* | 1/2019 | Beddus | H04L 9/3273 |
| 2019/0281547 A1* | 9/2019 | Yoon | H04N 21/42684 |
| 2020/0145814 A1* | 5/2020 | Lu | H04L 63/0869 |
| 2021/0168116 A1* | 6/2021 | Shulman | G06F 21/33 |
| 2022/0014514 A1* | 1/2022 | Tate | H04L 9/3228 |
| 2023/0054954 A1* | 2/2023 | Lee | H02J 50/001 |
| 2025/0184726 A1* | 6/2025 | Guo | H04W 76/10 |

\* cited by examiner (a)        (b)        (c)

IMAGE DISPLAY APPARATUS, MOBILE TERMINAL, AND IMAGE SYSTEM INCLUDING THE SAME

CROSS-REFERENCE TO RELATED APPLICATION(S)

Pursuant to 35 U.S.C. § 119, this application claims the benefit of earlier filing date and right of priority to Korean Application No(s). 10-2023-0058415, May 4, 2023, the contents of which are all incorporated by reference herein in its entirety.

BACKGROUND

1. Field

The present disclosure relates to an image display apparatus, a mobile terminal, and an image system including the same, and more particularly, to an image display apparatus, a mobile terminal, and an image system including the same which can dynamically generate a certificate.

2. Description of the Related Art

The image display apparatus is a device that displays an image.

Meanwhile, various images can be displayed through the image display apparatus, and in particular, a broadcast image based on a broadcast signal can be displayed.

In recent years, a scheme of sharing the content from a mobile terminal through mirroring has been attempted to share a content with peripheral devices.

However, there is an inconvenience in that setting for pairing between the image display apparatus and the mobile terminal should be each performed for the mirroring.

Further, there is a disadvantage in that sharing the content through the mirroring between the image display apparatus and the mobile terminal can be vulnerable to a security risk.

SUMMARY

An object of the present disclosure is to provide an image display apparatus, a mobile terminal, and an image system including the same that can dynamically generate a certificate.

Meanwhile, another object of the present disclosure is to provide an image display apparatus, a mobile terminal, and an image system including the same that can strengthen security when sharing a content between the image display apparatus and the mobile terminal.

Meanwhile, yet another object of the present disclosure is to provide an image display apparatus, a mobile terminal, and an image system including the same that can stably access a server even though a server address of the mobile terminal is varied.

In order to solve the problem, there is provided an image display apparatus according to one embodiment of the present disclosure, which includes: a display; a signal processing device configured to output an image signal to the display; and an interface configured to exchange data with a mobile terminal or a server, in which the interface receives a connection request and a network address of the mobile terminal from the mobile terminal, and the signal processing device performs control to generate a certificate and a security key based on the network address of the mobile terminal, and transmit the generated certificate and security key to the mobile terminal.

Meanwhile, the interface may receive, after transmitting the generated certificate and security key, a server address of a server executed by the mobile terminal, access the server of the mobile terminal based on the server address, and receive a content from the mobile terminal.

Meanwhile, the signal processing device may be configured to display the content on the display after receiving the content from the mobile terminal.

Meanwhile, the signal processing device may be configured to display content reception information after receiving the content from the mobile terminal.

Meanwhile, the server executed by the mobile terminal may include a hypertext transfer protocol secure server.

Meanwhile, the signal processing device may generate the certificate including a plurality of network addresses including the network address of the mobile terminal.

Meanwhile, in response to the signal processing device receiving a second network address included in the plurality of network addresses from the mobile terminal after transmitting the generated certificate and security key to the mobile terminal, the signal processing device may be configured to transmit the pre-generated certificate and security key to the mobile terminal.

Meanwhile, in case in which the signal processing device transmits the generated certificate and security key to the mobile terminal, receives the server address of the server executed by the mobile terminal, and then receives the second network address included in the plurality of network addresses from the mobile terminal, the signal processing device may access the server of the mobile terminal based on the server address of the server without additional transmission of the certificate and the security key to the mobile terminal to receive the content from the mobile terminal.

Meanwhile, in case in which the signal processing device transmits the generated certificate and security key to the mobile terminal, and then receives a second network address not included in the plurality of network addresses from the mobile terminal, the signal processing device may be configured to generate a second certificate and a second security key based on the second network address of the mobile terminal, and transmit the generated second certificate and second security key to the mobile terminal.

Meanwhile, the interface may receive, after transmitting the generated second certificate and security key, a second server address of a second server executed by the mobile terminal, access the server of the mobile terminal based on the second server address, and receive a second content from the mobile terminal.

Meanwhile, in case in which the signal processing device transmits the generated certificate and security key to the mobile terminal, and then receives a second connection request and a second network address from a second mobile terminal, the signal processing device may be configured to generate the second certificate and the second security key based on the second network address of the second mobile terminal, and transmit the generated second certificate and second security key to the second mobile terminal.

Meanwhile, the interface may receive, after transmitting the generated second certificate and second security key, a second server address of a second server executed by the second mobile terminal, access the server of the second mobile terminal based on the second server address, and receive a second content from the second mobile terminal.

In order to the solve the problem, there are provided a mobile terminal and an image system including the same according to one embodiment of the present disclosure, which include: a display; a controller configured to output an image signal to the display; and a wireless transceiver configured to exchange data with an image display apparatus, in which the controller performs control, when a sharing item of a content displayed on the display is selected or when a sharing application is executed, to transmit a connection request and a network address to the image display apparatus, receive a certificate and a security key received from the image display apparatus, and execute a server for sharing the content.

Meanwhile, the controller may be configured to transmit the server address to the image display apparatus after executing the server, and is configured to transmit the content to the image display apparatus based on the server access in the image display apparatus.

Meanwhile, in response to a sharing item of a second content displayed on the display being selected or in response to the sharing application being executed, the controller may be configured to, after executing the server, transmit a second connection request and a second network address to the image display apparatus, receive a second certificate and a second security key received from the image display apparatus, and execute a second server for sharing the second content.

Meanwhile, in response to the sharing item of the second content displayed on the display being selected or in response to the sharing application being executed after executing the server, the controller may be configured to, transmit the second connection request and the second network address to the image display apparatus, receive a second certificate and a second security key received from the image display apparatus, and execute the second server for sharing the second content again in response to the certificate and the security key being received from the image display apparatus again or the certificate and the security key being not received for a predetermined time.

Effects

According to one embodiment of the present disclosure, an image display apparatus and an image system including the same include: a display; a signal processing device configured to output an image signal to the display; and an interface configured to exchange data with a mobile terminal or a server, and the interface receives a connection request and a network address of the mobile terminal from the mobile terminal, and the signal processing device is configured to generate a certificate and a security key based on the network address of the mobile terminal, and transmit the generated certificate and security key to the mobile terminal. Therefore, the certificate may be dynamically generated. In addition, the security may be strengthened when sharing contents between the image display apparatus and the mobile terminal. Furthermore, even though a server address of the mobile terminal is varied, stable access may be made.

Meanwhile, the interface may receive, after transmitting the generated certificate and security key, a server address of a server executed by the mobile terminal, access the server of the mobile terminal based on the server address, and receive a content from the mobile terminal. Therefore, the certificate may be dynamically generated. In addition, the security may be strengthened when sharing contents between the image display apparatus and the mobile terminal.

Meanwhile, the signal processing device may be configured to display the content on the display after receiving the content from the mobile terminal. Therefore, the certificate may be dynamically generated, and the content may be conveniently shared.

Meanwhile, the signal processing device may be configured to display content reception information after receiving the content from the mobile terminal. Therefore, the certificate may be dynamically generated, and the content may be conveniently shared.

Meanwhile, the server executed by the mobile terminal may include a hypertext transfer protocol secure server. Accordingly, the certificate may be dynamically generated, and the security may be strengthened when sharing the contents between the image display apparatus and the mobile terminal.

Meanwhile, the signal processing device may generate the certificate including a plurality of network addresses including the network address of the mobile terminal. Therefore, the certificate may be dynamically generated.

Meanwhile, in response to the signal processing device receiving a second network address included in the plurality of network addresses from the mobile terminal after transmitting the generated certificate and security key to the mobile terminal, the signal processing device may be configured to transmit the pre-generated certificate and security key to the mobile terminal. Accordingly, the certificate may be conveniently generated when the second network address is received.

Meanwhile, in case in which the signal processing device transmits the generated certificate and security key to the mobile terminal, receives the server address of the server executed by the mobile terminal, and then receives the second network address included in the plurality of network addresses from the mobile terminal, the signal processing device may access the server of the mobile terminal based on the server address of the server without additional transmission of the certificate and the security key to the mobile terminal to receive the content from the mobile terminal. Accordingly, the content may be conveniently generated when the second network address is received.

Meanwhile, in case in which the signal processing device transmits the generated certificate and security key to the mobile terminal, and then receives a second network address not included in the plurality of network addresses from the mobile terminal, the signal processing device may be configured to generate a second certificate and a second security key based on the second network address of the mobile terminal, and transmit the generated second certificate and second security key to the mobile terminal. Accordingly, the second certificate different from the existing generated certificate may be dynamically generated when the second network address is received.

Meanwhile, the interface may receive, after transmitting the generated second certificate and security key, a second server address of a second server executed by the mobile terminal, access the server of the mobile terminal based on the second server address, and receive a second content from the mobile terminal. Accordingly, the contents may be conveniently shared between the image display apparatus and the mobile terminal based on the dynamically generated second certificate.

Meanwhile, in case in which the signal processing device transmits the generated certificate and security key to the mobile terminal, and then receives a second connection request and a second network address from a second mobile terminal, the signal processing device may be configured to generate the second certificate and the second security key based on the second network address of the second mobile terminal, and transmit the generated second certificate and second security key to the second mobile terminal. Accordingly, the contents may be conveniently shared between the image display apparatus and the mobile terminal based on the dynamically generated second certificate.

Meanwhile, the interface may receive, after transmitting the generated second certificate and second security key, a second server address of a second server executed by the second mobile terminal, access the server of the second mobile terminal based on the second server address, and receive a second content from the second mobile terminal. Accordingly, the contents may be conveniently shared between the image display apparatus and the mobile terminal based on the dynamically generated second certificate.

According to one embodiment of the present disclosure, a mobile terminal and an image system including the same include: a display; a controller configured to output an image signal to the display; and a wireless transceiver configured to exchange data with an image display apparatus, in which in response to a sharing item of a content displayed on the display being selected or in response to a sharing application being executed, the controller is configured to transmit a connection request and a network address to the image display apparatus, receive a certificate and a security key received from the image display apparatus, and execute a server for sharing the content. Therefore, the certificate may be dynamically generated. In addition, the security may be strengthened when sharing contents between the image display apparatus and the mobile terminal.

Meanwhile, the controller may be configured to transmit the server address to the image display apparatus after executing the server, and is configured to transmit the content to the image display apparatus based on the server access in the image display apparatus. Accordingly, the contents may be conveniently shared between the image display apparatus and the mobile terminal based on the dynamically generated certificate.

Meanwhile, in response to a sharing item of a second content displayed on the display being selected or in response to the sharing application being executed, the controller may be configured to, after executing the server, transmit a second connection request and a second network address to the image display apparatus, receive a second certificate and a second security key received from the image display apparatus, and execute a second server for sharing the second content. Accordingly, the second content may be conveniently shared between the image display apparatus and the mobile terminal based on the dynamically generated second certificate.

Meanwhile, in response to the sharing item of the second content displayed on the display being selected or in response to the sharing application being executed after executing the server, the controller may be configured to, transmit the second connection request and the second network address to the image display apparatus, receive a second certificate and a second security key received from the image display apparatus, and execute the second server for sharing the second content again in response to the certificate and the security key being received from the image display apparatus again or the certificate and the security key being not received for a predetermined time Accordingly, the contents may be conveniently shared between the image display apparatus and the mobile terminal based on the dynamically generated second certificate.

DETAILED DESCRIPTION OF THE PREFERRED EMBODIMENTS

Hereinafter, the present disclosure will be described in detail with reference to the accompanying drawings.

As used herein, the suffixes "module" and "unit" are added to simply facilitate preparation of this specification and are not intended to suggest special meanings or functions. Therefore, the suffixes "module" and "unit" may be used interchangeably.

Figure 1:
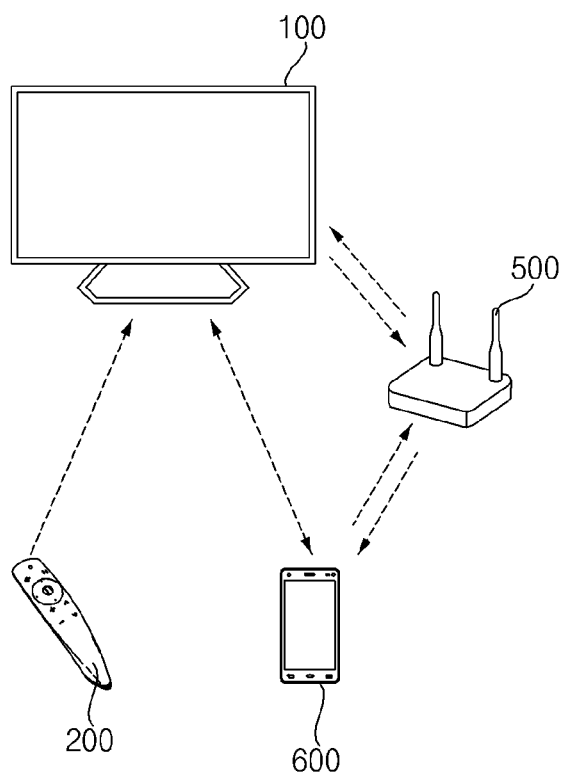
FIG. 1 is a diagram illustrating an image display system of one embodiment of the present disclosure.

FIG. 1 is a diagram illustrating an image display system according to one embodiment of the present disclosure.

Referring to the drawing, an image display system 10 according to one embodiment of the present disclosure includes an image display apparatus 100 and a mobile terminal 600.

Meanwhile, the image display system 10 according to one embodiment of the present disclosure may further include an access point apparatus 500.

The access point apparatus 500 may allocate a network address to the image display apparatus 100, the mobile terminal 600, etc., and transmit data based on the allocated network address.

Meanwhile, the access point apparatus 500 may vary the network address allocated to the mobile terminal 500 every access of the mobile terminal 600.

Figure 2:
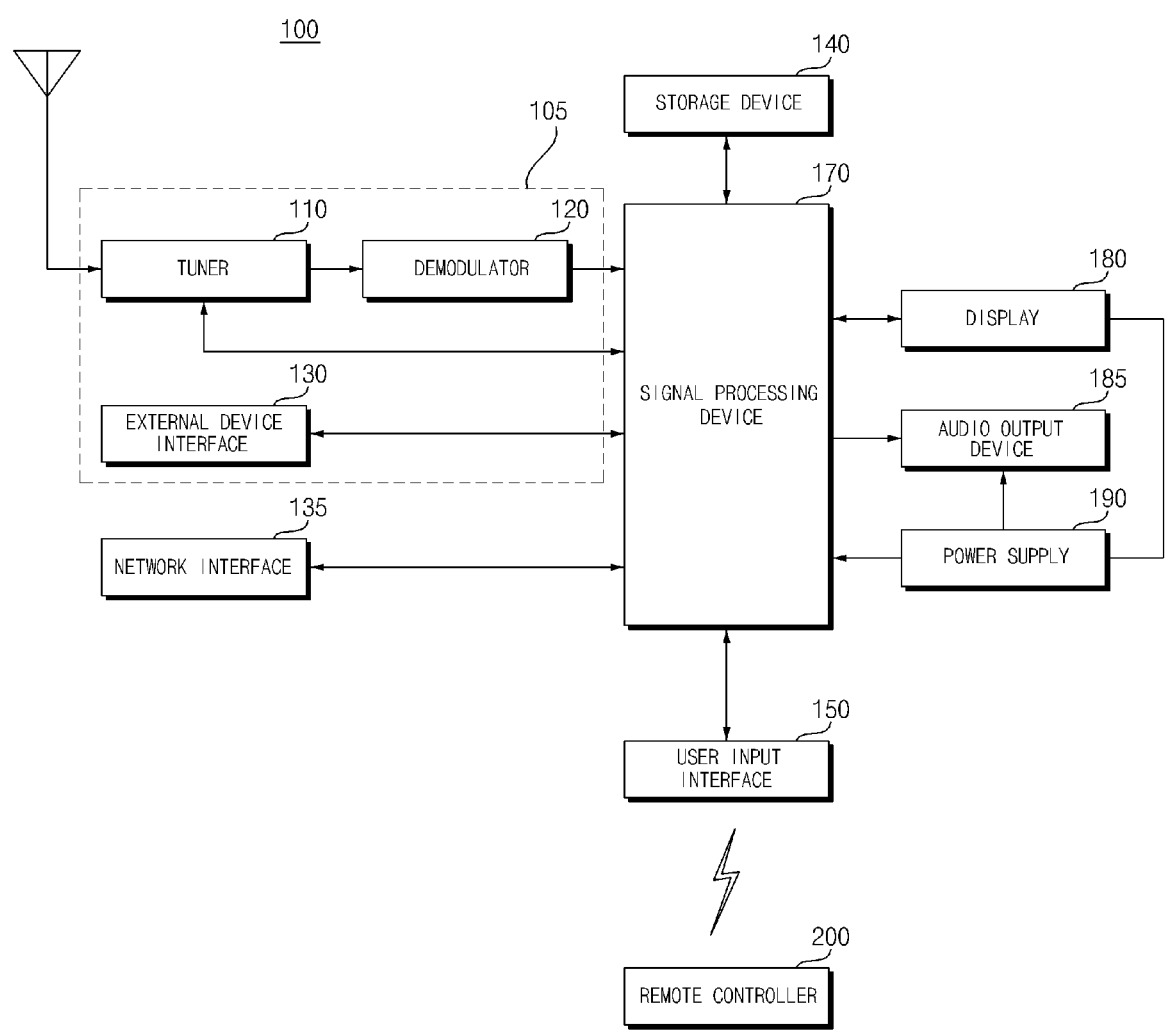
FIG. 2 is an internal block diagram illustrating an image display apparatus of FIG. 1.

The image display apparatus 100 according to one embodiment of the present disclosure includes a signal processing device 170 of FIG. 2, which outputs an image signal to a display 180, and a network interface 135 of FIG. 2, which exchanges data with the mobile terminal 600 or a server.

The image display apparatus 100 according to one embodiment of the present disclosure is configured to receive a connection request and the network address of the mobile terminal 600 from the mobile terminal 600, generate a certificate and a security key based on the network address of the mobile terminal, and transmit the generated certificate and security key to the mobile terminal 600. Therefore, the certificate may be dynamically generated. In addition, a security may be strengthened when sharing a content between the image display apparatus 100 and the mobile terminal 600. Furthermore, even though a server address of the mobile terminal 600 is varied, the image display apparatus 100 may stably access a server.

Meanwhile, the image display apparatus 100 according to one embodiment of the present disclosure may receive, after transmitting the generated certificate and security key, a server address of a server executed by the mobile terminal 600, access the server of the mobile terminal 600 based on the server address, and receive a content from the mobile terminal 600. In addition, the content may be conveniently shared between the image display apparatus 100 and the mobile terminal 600.

Meanwhile, the server executed by the mobile terminal 600 includes a hypertext transfer protocol secure server. In addition, the certificate may be dynamically generated, and the security may be strengthened when sharing the content between the image display apparatus 100 and the mobile terminal 600.

Figure 5:
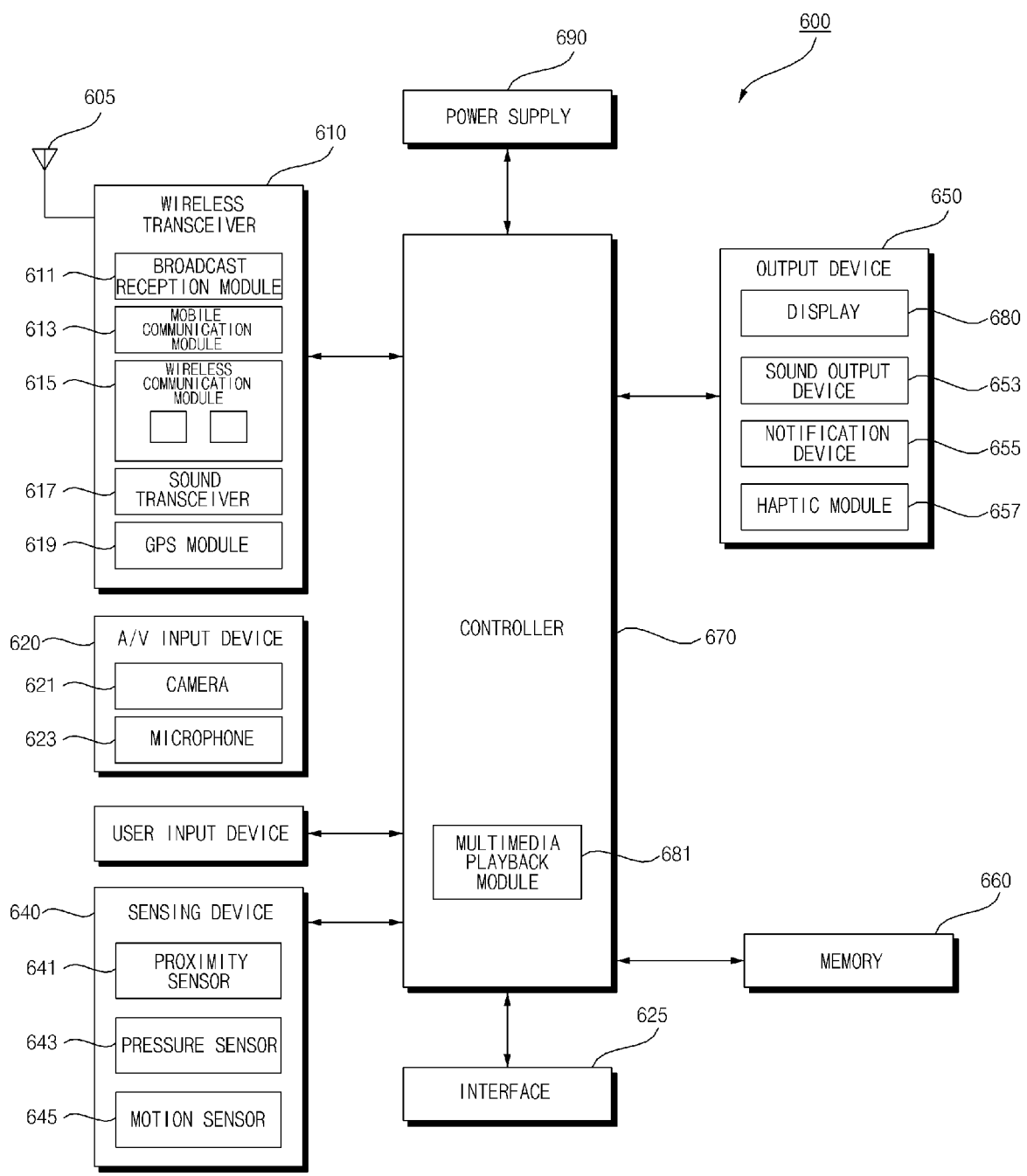
FIG. 5 is an internal block diagram illustrating a mobile terminal of FIG. 1.

The mobile terminal 100 according to one embodiment of the present disclosure includes a display 680, a controller 670 of FIG. 5, which outputs an image signal to the display 680, and a wireless transceiver 610 of FIG. 5, which exchanges data with the image display apparatus 100.

The mobile terminal 100 according to one embodiment of the present disclosure controls, when a sharing item of a content displayed on the display 680 is selected or when a sharing application is executed, to transmit a connection request and a network address to the image display apparatus 100, receives a certificate and a security key received from the image display apparatus 100, and executes a server for sharing the content. Therefore, the certificate may be dynamically generated. In addition, the security may be strengthened when sharing a content between the image display apparatus 100 and the mobile terminal 600.

Meanwhile, the mobile terminal 100 according to one embodiment of the present disclosure is configured to transmit the server address to the image display apparatus 100 after executing the server, and is configured to transmit the content to the image display apparatus 100 based on the server access in the image display apparatus 100. Accordingly, the content may be conveniently shared between the image display apparatus 100 and the mobile terminal 600 based on the dynamically generated certificate.

Meanwhile, as the image display apparatus 100 of FIG. 1, a TV, a monitor, a tablet PC, or a vehicle display apparatus is available.

Meanwhile, as the mobile terminal 600 of FIG. 1, a smartphone, a tablet PC, a laptop computer, etc., is available.

FIG. 2 is an internal block diagram illustrating the image display apparatus of FIG. 1.

Referring to the drawing, the image display apparatus 100 according to one embodiment of the present disclosure may include an image receiver 105, an external device interface 130, a network interface 135, a storage device 140, a user input interface 150, a sensor device (not illustrated), a signal processing device 170, a display 180, and an audio output device 185.

The image receiver 105 may receive an input image. For example, the image receiver 105 may receive a broadcast image, an HDMI image, or an external input image such as a streamed image.

The image receiver 105 may include a tuner 110, a demodulator 120, and an external device interface 130.

Unlike the drawing, the image receiver 105 may include the tuner 110, the demodulator 120, the external device interface 130, and a network interface 135.

The tuner 110 selects a channel selected by a user from among radio frequency (RF) broadcast signals received through an antenna (not illustrated) or an RF broadcast signal corresponding to all pre-stored channels. In addition, the tuner 110 converts the selected RF broadcast signal into a middle-frequency signal, a baseband image, or a voice signal.

To receive broadcast signals of a plurality of channels, a plurality of tuners 110 may be provided. Alternatively, a single tuner to receive a plurality of channels simultaneously may be provided.

The demodulator 120 receives and demodulates a digital IF (DIF) signal converted by the tuner 110.

After performing demodulation and channel decoding, the demodulator 120 may output a stream signal (TS). Herein, the stream signal may be a signal obtained by multiplexing an image signal, voice signal or data signal.

The stream signal output from the demodulator 120 may be input to the signal processing device 170. After performing demultiplexing and image/voice signal processing, the signal processing device 170 outputs an image to the display 180 and voice to the audio output device 185.

The external device interface 130 may transmit or receive data to or from a connected external device (not illustrated), for example, a set-top box 50.

To this end, the external device interface 130 may include an A/V input/output device (not illustrated), a wireless transceiver (not illustrated), and the like.

The external device interface 130 may be connected to external devices such as a digital versatile disc (DVD) player, a Blu-ray player, a gaming device, a camera, a camcorder, a computer (laptop), and a set-top box in a wired/wireless manner, and perform input/output operations with external devices.

The A/V input/output device in the external device interface 130 may receive the image and voice signal of the external device. Meanwhile, the wireless transceiver (not illustrated) in the external device interface 130 may perform short-range wireless communication with other electronic devices.

The external device interface 130 may exchange data with a neighboring mobile terminal 600 via the wireless transceiver (not illustrated). In particular, in the mirroring mode, the external device interface 130 may receive device information, information about an executed application and an application image from the mobile terminal 600.

The network interface 135 provides an interface for connecting the image display apparatus to a wired/wireless network including the Internet. For example, the network interface 135 may receive content or data provided by the Internet or a content provider or network operator through a network.

The network interface 135 may include a wireless transceiver (not illustrated).

The storage device 140 may store programs for processing and control of signals in the signal processing device 170, and also store a signal-processed image, voice signal or data signal.

The storage device 140 may function to temporarily store an image signal, a voice signal, or a data signal input through the external device interface 130. In addition, the storage device 140 may store information about a predetermined broadcast channel through the channel memorization function such as a channel map.

While it is illustrated in FIG. 2 that the storage device 140 is provided separately from the signal processing device 170, embodiments of the present disclosure are not limited thereto. The storage device 140 may be included in the signal processing device 170.

The user input interface 150 may transmit a signal input by the user to the signal processing device 170 or transmit a signal from the signal processing device 170 to the user.

For example, the user input interface 150 may transmit/receive user input signals such as power on/off, channel selection, and screen setting to/from the remote controller 200, deliver user input signals input through local keys (not illustrated) such as a power key, a channel key, a volume key, or a setting key, deliver user input signals input through a sensor device (not illustrated) to sense user gestures to the signal processing device 170, or transmit a signal from the signal processing device 170 to the sensor device (not illustrated).

The signal processing device 170 may demultiplex streams input through the tuner 110, demodulator 120, network interface 135, or external device interface 130, or process demultiplexed signals. Thereby, the signal processing device 170 may generate an output signal for outputting an image or voice.

For example, the signal processing device 170 may receive a broadcast signal or HDMI signal received from the image receiver 105, perform signal processing based on the received broadcast signal or HDMI signal, and output the signal-processed image signal.

An image signal image-processed by the signal processing device 170 may be input to the display 180 and an image corresponding to the image signal may be displayed. In addition, the image signal which is image-processed by the signal processing device 170 may be input to an external output device through the external device interface 130.

A voice signal processed by the signal processing device 170 may be output to the audio output device 185 in the form of sound. In addition, the voice signal processed by the signal processing device 170 may be input to an external output device through the external device interface 130.

Although not illustrated in FIG. 2, the signal processing device 170 may include a demultiplexer, an image processor, and the like. That is, the signal processing device 170 may perform various signal processing, and thus may be implemented in the form of a System On Chip (SOC). This will be described later with reference to FIG. 3.

Additionally, the signal processing device 170 may be configured to overall operation of the image display apparatus 100. For example, the signal processing device 170 may be configured to the tuner 110 to tune to an RF broadcast corresponding to a channel selected by the user or a pre-stored channel.

The signal processing device 170 may be configured to the image display apparatus 100 according to a user command input through the user input interface 150 or an internal program.

The signal processing device 170 may be configured to the display 180 to display an image. Herein, the image displayed on the display 180 may be a still image, a moving image, a 2D image, or a 3D image.

The signal processing device 170 may be configured to display the predetermined object in an image displayed on the display 180. For example, the object may be at least one of an accessed web page (a newspaper, a magazine, or the like), electronic program guide (EPG), various menus, a widget, an icon, a still image, a moving image, and text.

The signal processing device 170 may recognize the location of the user based on an image captured by a capture device (not illustrated). For example, the signal processing device 170 may recognize a distance (a z-axis coordinate) between the user and the image display apparatus 100. Additionally, the signal processing device 170 may recognize an x-axis coordinate and a y-axis coordinate corresponding to the location of the user in the display 180.

The display 180 generates drive signals by converting an image signal, data signal, OSD signal, and control signal processed by the signal processing device 170 or an image signal, data signal, and control signal received from the external device interface 130. The display 180 may be configured as a touch screen and used as an input device in addition to an output device.

The audio output device 185 receives a voice signal processed by the signal processing device 170 and outputs voice.

The capture device (not illustrated) captures the user. The capture device (not illustrated) may be implemented with one camera, but is not limited thereto, and may be implemented with a plurality of cameras. Image information captured by the capture device (not illustrated) may be input to the signal processing device 170.

The signal processing device 170 may sense user gestures based on an image captured by the capture device (not illustrated), a sensed signal from the sensor device (not illustrated), or a combination thereof.

The signal processing device 170 may be implemented in the form of a System On Chip (SOC).

The power supply 190 supplies corresponding power throughout the image display apparatus 100. In particular, the power supply 190 may supply power to the signal processing device 170 implemented in the form of a System On Chip (SOC), the display 180 for displaying images, an audio output device 185 for outputting audio, or the like.

Specifically, the power supply 190 may include a converter to convert alternating current (AC) power into direct current (DC) power and a DC-DC converter to change the level of the DC power.

The remote controller 200 transmits user input to the user input interface 150. To this end, the remote controller 200 may employ Bluetooth, radio frequency (RF) communication, infrared (IR) communication, ultra-wideband (UWB), or ZigBee. In addition, the remote controller 200 may receive an image signal, a voice signal, or a data signal output from the user input interface 150, and display the signals on the remote controller 200 or voice-output.

The image display apparatus 100 may be a fixed or mobile digital broadcast receiver capable of receiving digital broadcast services.

The block diagram of the image display apparatus 100 illustrated in FIG. 2 is a block diagram for one embodiment of the present disclosure. Constituents of the block diagram may be integrated, added or omitted according to the specifications of the image display apparatus 100 which is implemented in reality. That is, two or more constituents may be combined into one constituent, or one constituent may be subdivided into two or more constituents, when necessary. In addition, the function performed in each block is simply illustrative, and it should be noted that specific operations or devices of the blocks do not limit the scope of the present disclosure.

Figure 3:
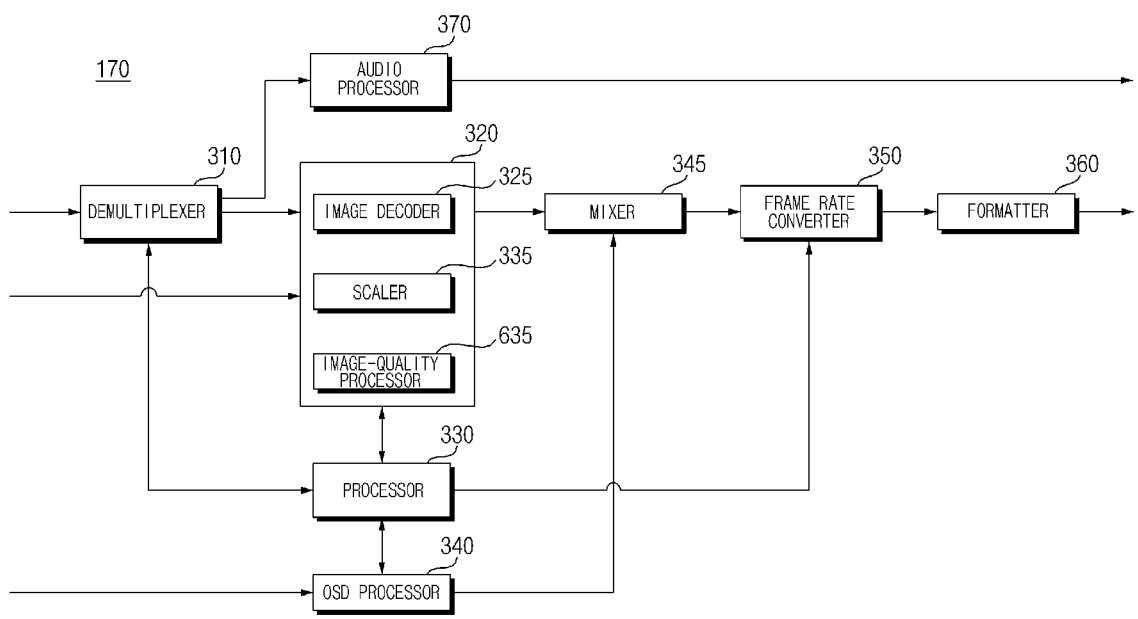
FIG. 3 is an internal block diagram illustrating a signal processing device of FIG. 2.

FIG. 3 is an internal block diagram illustrating the signal processing device of FIG. 2.

Referring to the drawings, the signal processing device 170 according to one embodiment of the present disclosure may include a demultiplexer 310, an image processor 320, a processor 330, and an audio processor 370. In addition, the signal processing device 170 may further include a data processor (not illustrated).

The demultiplexer 310 demultiplexes an input stream. For example, when an MPEG-2 TS is input, the demultiplexer 310 may demultiplex the MPEG-2 TS to separate the MPEG-2 TS into an image signal, a voice signal and a data signal. Herein, the stream signal input to the demultiplexer 310 may be a stream signal output from the tuner 110, the demodulator 120 or the external device interface 130.

The image processor 320 may perform signal processing on an input image. For example, the image processor 320 may perform image processing of an image signal demultiplexed by the demultiplexer 310.

To this end, the image processor 320 includes an image decoder 325, a scaler 335, an image-quality processor 635, an image encoder (not illustrated), an OSD processor 340, a frame rate converter 350, and a formatter 360, and the like.

The image decoder 325 decodes the demultiplexed image signal, and the scaler 335 scales the resolution of the decoded image signal such that the image signal can be output through the display 180.

The image decoder 325 may include decoders of various standards. For example, the image decoder 325 may include an MPEG-2 decoder, an H.264 decoder, a 3D image decoder for color images and depth images, and a decoder for multi-viewpoint images.

The scaler 335 may scale an input image signal that has been image decoded by the image decoder 325 or the like.

For example, the scaler 335 may perform up-scaling when the size or resolution of the input image signal is small, and down-scaling when the size or resolution of the input image signal is large.

The image-quality processor 635 may perform image quality processing on an input image signal that has been image decoded in the image decoder 325 or the like.

For example, the image-quality processor 635 may perform noise removal processing of the input image signal, expand the resolution of gray levels of an input image signal, improve image resolution, performs high dynamic range (HDR) based signal processing, change the frame rate, or perform image quality processing corresponding to panel characteristics, particularly organic light emitting panels or the like.

The OSD processor 340 generates an OSD signal automatically or according to user input. For example, the OSD processor 340 may generate a signal for display of various kinds of information in the form of images or text on the screen of the display 180 based on a user input signal. The generated OSD signal may include various data including the user interface screen window of the image display apparatus 100, various menu screen windows, widgets, and icons. The generated OSD signal may also include a 2D object or a 3D object.

The OSD processor 340 may generate a pointer which can be displayed on the display, based on a pointing signal input from the remote controller 200. In particular, the pointer may be generated by a pointing signal processing device (not illustrated), and the OSD processor 340 may include the pointing signal generator. Of course, it is possible to provide the pointing signal processing device (not illustrated) separately from the OSD processor 340.

The frame rate converter (FRC) 350 may convert the frame rate of an input image. The FRC 350 may output frames without performing separate frame rate conversion.

The formatter 360 may change the format of an input image signal into an image signal for display on a display and output the changed image signal.

In particular, the formatter 360 may change the format of the image signal to correspond to the display panel.

Meanwhile, the formatter 360 may change the format of an image signal. For example, the format of the 3D image signal may be changed to any one format of various 3D formats such as a Side by Side format, a Top/Down format, a Frame Sequential format, an Interlaced format, a Checker Box format.

The processor 330 may be configured to overall operations within the image display apparatus 100 or signal processing device 170.

For example, the processor 330 may be configured to the tuner 110 to select (tuning) an RF broadcast corresponding to a channel selected by a user or a pre-stored channel.

The processor 330 may be configured to the image display apparatus 100 according to a user command input through the user input interface 150 or an internal program.

The processor 330 may perform data transfer control with the network interface 135 or the external device interface 130.

The processor 330 may be configured to operations of the demultiplexer 310 and the image processor 320 within the signal processing device 170.

An audio processor 370 in the signal processing device 170 may voice-process a demultiplexed voice signal. To this end, the audio processor 370 may include various decoders.

The audio processor 370 in the signal processing device 170 may perform processing such as adjustment of bass, treble, and volume.

The data processor (not illustrated) in the signal processing device 170 may perform data processing on a demultiplexed data signal. For example, when the demultiplexed data signal is a coded data signal, the data processor (not illustrated) may decode the data signal. The coded data signal may be electronic program guide information including broadcast information such as a start time and end time of a broadcast program broadcast on each channel.

The block diagram of the signal processing device 170 illustrated in FIG. 3 is a block diagram for one embodiment of the present disclosure. Constituents of the block diagram may be integrated, added, or omitted according to the specifications of the signal processing device 170 which is implemented in reality.

In particular, the frame rate converter 350 and the formatter 360 may be separately provided in addition to the image processor 320.

Figure 4A:
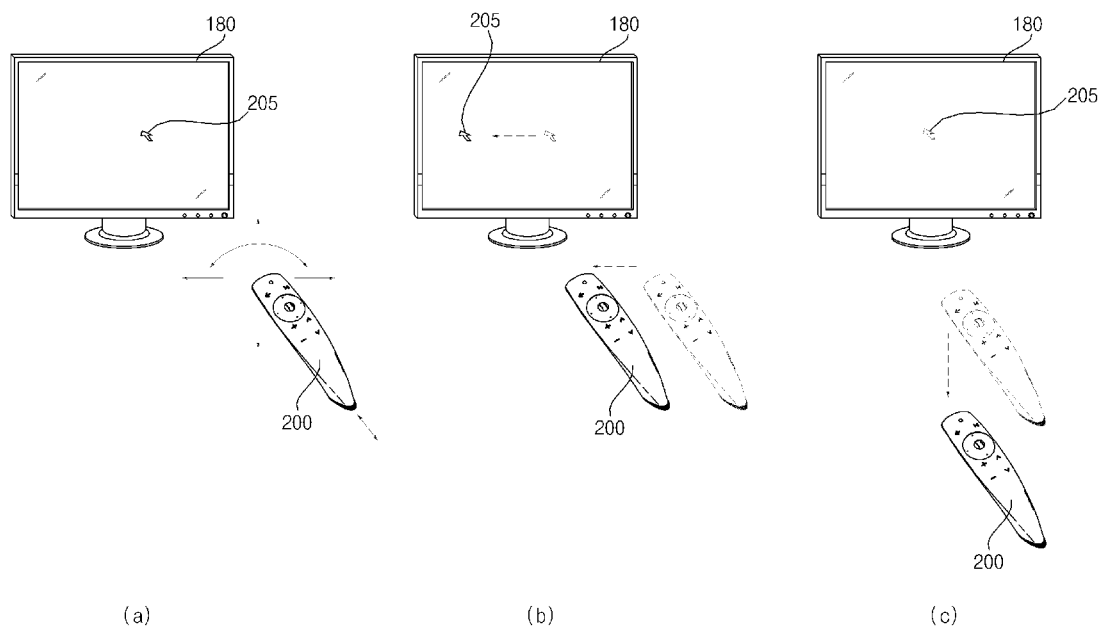
FIG. 4A illustrates a method for controlling a remote controller of FIG. 2.

FIG. 4A illustrates a method for controlling the remote controller of FIG. 2.

As illustrated in FIG. 4A (a), a pointer 205 corresponding to the remote controller 200 may be displayed on the display 180.

The user may move the remote controller 200 up and down, left and right (FIG. 4A (b)), or back and forth (FIG. 4A (c)) or rotate the same. The pointer 205 displayed on the display 180 of the image display apparatus corresponds to movement of the remote controller 200. As illustrated in the drawings, since the pointer 205 moves according to movement of the remote controller 200 in the 3D space, the remote controller 200 may be referred to as a spatial remote control or a 3D pointing device.

FIG. 4A (b) illustrates a case where the pointer 205 displayed on the display 180 of the image display apparatus moves to the left when the user moves the remote controller 200 to the left.

Information about movement of the remote controller 200 sensed through a sensor of the remote controller 200 is transmitted to the image display apparatus. The image display apparatus may calculate coordinates of the pointer 205 based on the information about the movement of the remote controller 200. The image display apparatus may display the pointer 205 such that the pointer 205 corresponds to the calculated coordinates.

FIG. 4A (c) illustrates a case where the user moves the signal processing device 170 away from display 180 in a state where the user presses down a specific button in the remote controller 200. In this case, a selected area on the display 180 corresponding to the pointer 205 may be zoomed in and displayed with the size thereof increased. On the other hand, when the user moves the remote controller 200 closer to the display 180, the selected area in the display 180 corresponding to the pointer 205 may be zoomed out and displayed with the size thereof reduced. Alternatively, the selected area may be zoomed out when the remote controller 200 moves away from the display 180, and may be zoomed in when the remote controller 200 moves closer to the display 180.

Vertical and lateral movement of the remote controller 200 may not be recognized while the specific button in the remote controller 200 is pressed down. That is, when the remote controller 200 approaches or moves away from the display 180, vertical and lateral movements thereof may not be recognized, but back-and-forth movement thereof may be recognized. When the specific button in the remote controller 200 is not pressed down, the pointer 205 only moves according to vertical and lateral movements of the remote controller 200.

The speed and direction of movement of the pointer 205 may correspond to the speed and direction of movement of the remote controller 200.

Figure 4B:
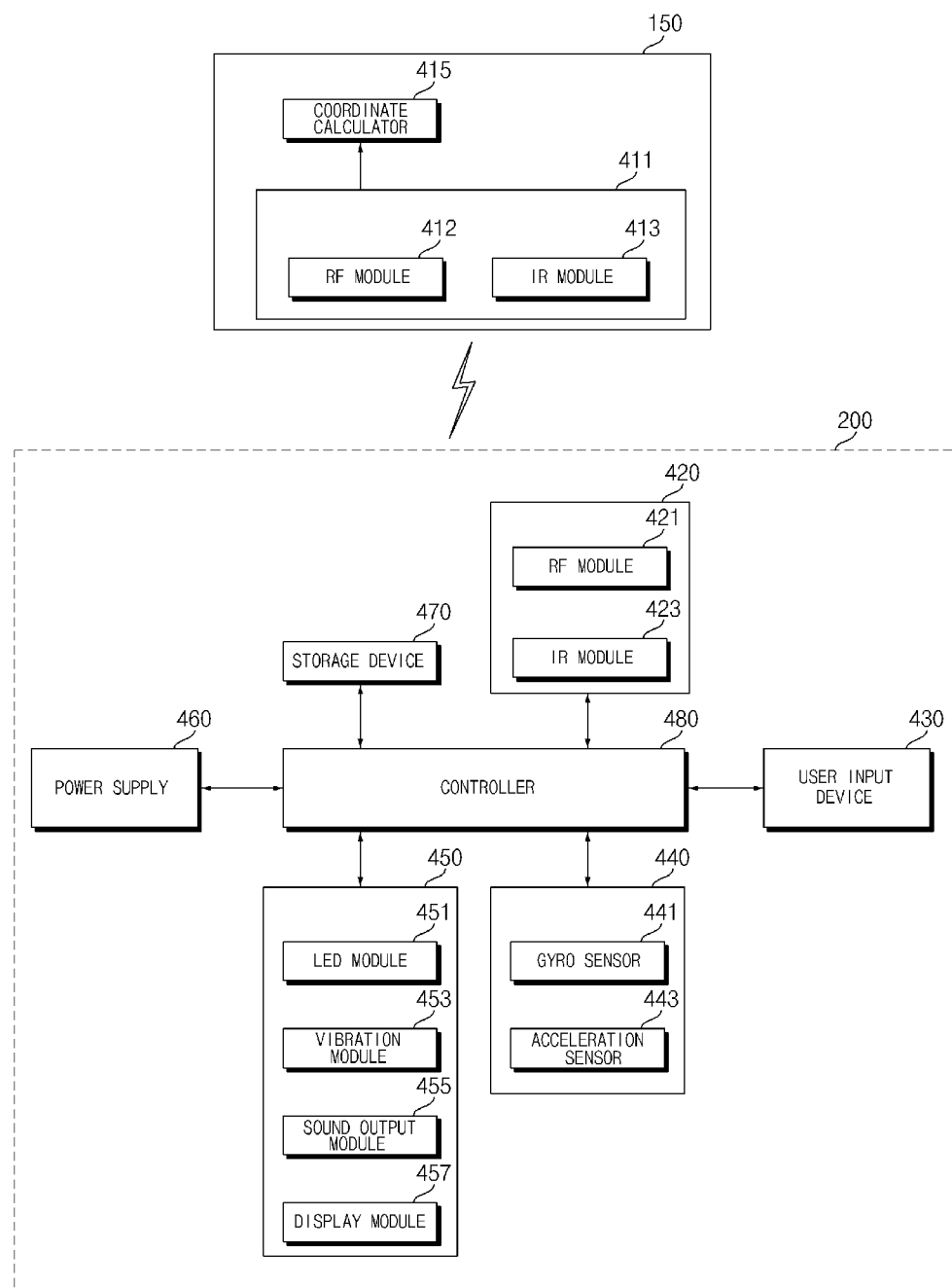
FIG. 4B is an internal block diagram illustrating the remote controller of FIG. 2.

FIG. 4B is an internal block diagram illustrating the remote controller of FIG. 2.

Referring to the drawing, the remote controller 200 may include a wireless transceiver 425, a user input device 430, a sensor device 440, an output device 450, a power supply 460, a storage device 470, and a controller 480.

The wireless transceiver 425 transmits and receives signals to and from one of the image display apparatuses according to embodiments of the present disclosure described above. Hereinafter, one image display apparatus 100 according to one embodiment of the present disclosure will be described.

In this embodiment, the remote controller 200 may include an RF module 421 capable of transmitting and receiving signals to and from the image display apparatus 100 according to an RF communication standard. The remote controller 200 may further include an IR module 423 capable of transmitting and receiving signals to and from the image display apparatus 100 according to an IR communication standard.

In this embodiment, the remote controller 200 transmits a signal including information about movement of the remote controller 200 to the image display apparatus 100 via the RF module 421.

In addition, the remote controller 200 may receive a signal from the image display apparatus 100 via the RF module 421. When necessary, the remote controller 200 may transmit commands related to power on/off, channel change, and volume change to the image display apparatus 100 via the IR module 423.

The user input device 430 may include a keypad, a button, a touchpad, or a touchscreen. The user may input a command related to the image display apparatus 100 with the remote controller 200 by manipulating the user input device 435. When the user input device 435 includes a hard key button, the user may input a command related to the image display apparatus 100 with the remote controller 200 by pressing the hard key button. When the user input device 435 includes a touchscreen, the user may input a command related to the image display apparatus 100 with the remote controller 200 by touching a soft key on the touchscreen. The user input device 430 may include various kinds of input means such as a scroll key and a jog key which are manipulatable by the user, but it should be noted that this embodiment does not limit the scope of the present disclosure.

The sensor device 440 may include a gyro sensor 441 or an acceleration sensor 443. The gyro sensor 441 may sense information about movement of the remote controller 200.

For example, the gyro sensor 441 may sense information about movement of the remote controller 200 with respect to the X, Y and Z axes. The acceleration sensor 443 may sense information about the movement speed of the remote controller 200. The sensor device 440 may further include a distance measurement sensor to sense a distance to the display 180.

The output device 450 may output an image signal or voice signal corresponding to manipulation of the user input device 435 or a signal transmitted from the image display apparatus 100. The user may recognize, via the output device 450, whether the user input device 435 is manipulated or the image display apparatus 100 is controlled.

For example, the output device 450 may include an LED module 451 to be turned on when the user input device 35 is operated or signals are transmitted to and received from the image display apparatus 100 via the wireless transceiver 425, a vibration module 453 to generate vibration, a sound output module 455 to output sound, or a display module 457 to output an image.

The power supply 460 supplies power to the remote controller 200. When the remote controller 200 does not move for a predetermined time, the power supply 460 may stop supplying power to save power. The power supply 460 may resume supply of power when the predetermined key provided to the remote controller 200 is manipulated.

The storage device 470 may store various kinds of programs and application data necessary for control or operation of the remote controller 200. When the remote controller 200 wirelessly transmits and receives signals to and from the image display apparatus 100 via the RF module 421, the remote controller 200 and the image display apparatus 100 may transmit and receive signals in a predetermined frequency band. The controller 480 of the remote controller 200 may store, in the storage device 470, information about, for example, a frequency band enabling wireless transmission and reception of signals to and from the image display apparatus 100 which is paired with the remote controller 200, and reference the same.

The controller 480 controls overall operation related to control of the remote controller 200. The controller 480 may transmit, via the wireless transceiver 425, a signal corresponding to manipulation of a predetermined key in the user input device 435 or a signal corresponding to movement of the remote controller 200 sensed by the sensor device 440 to the image display apparatus 100.

The user input interface 150 of the image display apparatus 100 may include a wireless transceiver 151 capable of wirelessly transmitting and receiving signals to and from the remote controller 200 and a coordinate calculator 415 capable of calculating coordinates of the pointer corresponding to operation of the remote controller 200.

The user input interface 150 may wirelessly transmit and receive signals to and from the remote controller 200 via an RF module 412. In addition, the user input interface 150 may receive, via an IR module 413, a signal transmitted from the remote controller 200 according to an IR communication standard.

The coordinate calculator 415 may calculate coordinates (x, y) of the pointer 205 to be displayed on the display 180, by correcting hand tremor or an error in a signal corresponding to operation of the remote controller 200 which is received via the wireless transceiver 151.

The transmitted signal of the remote controller 200 input to the image display apparatus 100 via the user input interface 150 is transmitted to the signal processing device 170 of the image display apparatus 100. The signal processing device 170 may determine information about an operation of the remote controller 200 or manipulation of a key from the signal transmitted from the remote controller 200, and control the image display apparatus 100 according to the information.

As another example, the remote controller 200 may calculate coordinates of the pointer corresponding to movement thereof and output the same to the user input interface 150 of the image display apparatus 100. In this case, the user input interface 150 of the image display apparatus 100 may transmit, to the signal processing device 170, information about the received coordinates of the pointer without separately correcting hand tremor or the error.

As another example, in contrast with the example of the drawing, the coordinate calculator 415 may be provided in the signal processing device 170 rather than in the user input interface 150.

FIG. 5 is an internal block diagram illustrating the mobile terminal of FIG. 1.

Referring to the drawing, the mobile terminal 600 may include a wireless transceiver 610, an audio/video (A/V) input device 620, a user input device 630, a sensing device 640, and an output device 650, a memory 660, an interface 625, a controller 670 and a power supply 690.

The wireless transceiver 610 may include a broadcast reception module 611, a mobile communication module 613, a wireless communication module 615, a sound transceiver 617, and a GPS module 619.

The broadcast reception module 611 may receive at least one of a broadcast signal or broadcast-related information from an external broadcast management server over a broadcast channel. Herein, the broadcast channel may include a satellite channel and a terrestrial channel.

The broadcast signal and/or broadcast-related information received through the broadcaster reception module 611 may be stored in the memory 660.

The mobile communication module 613 transmits and receives a radio signal to and from at least one of a base station, an external terminal or a server over a mobile communication network. Herein, the radio signal may include a voice call signal, a video call signal, or various kinds of data according to transmission and reception of a text/multimedia message.

The wireless communication module 615, which refers to a module for wireless communication access, may be installed inside or outside the mobile terminal 600. For example, the wireless communication module 615 may perform Wi-Fi-based wireless communication or Wi-Fi Direct-based wireless communication.

The sound transceiver 617 may perform sound communication. In the sound communication mode, the sound transceiver 617 may add data of predetermined information to audio data which is to be output and output sound. In addition, in the sound communication mode, the sound transceiver 617 may extract data of predetermined information from received sound.

Applicable short-range communication technologies may include Bluetooth, radio frequency identification (RFID), Infrared Data Association (IrDA), Ultra-Wideband (UWB), and ZigBee.

The GPS module 619 may receive location information from a plurality of GPS satellites.

The A/V input device 620 is used for input of an audio signal or a video signal and may include a camera 621 and a microphone 623.

The user input device 630 generates key input data input by the user to control operation of a terminal of the user. To this end, the user input device 630 may include a keypad, a dome switch, and a touchpad (resistive touchpad/capacitive touchpad). In particular, the touchpad may form a layered architecture together with the display 680, thereby realizing a touchscreen.

The sensing device 640 may generate a sensing signal for controlling operation of the mobile terminal 600 by sensing the current state of the mobile terminal 600, for example by sensing whether the mobile terminal 600 is in the open or closed position, where the mobile terminal 600 is located, and whether the user contacts the mobile terminal 600.

The sensing device 640 may include a proximity sensor 641, a pressure sensor 643 and a motion sensor 645. The motion sensor 645 may employ an acceleration sensor, a gyro sensor, a gravity sensor and the like to sense movement or the location of the mobile terminal. In particular, the gyro sensor, which is used to measure an angular speed, may sense orientation (angle) of the mobile terminal with respect to a reference direction.

The output device 650 may include a display 680, an audio output device 653, a notification device 655, and a haptic module 657.

The display 680 outputs and displays information processed by the mobile terminal 600.

As described above, when the display 680 forms a layered architecture with the touchpad to implement a touchscreen, the display 680 may be used not only as an output device but also as an input device for input of information according to user touch.

The audio output device 653 outputs audio data received from the wireless transceiver 610 or stored in the memory 660. The audio output device 653 may include a speaker and a buzzer.

The notification device 655 outputs a signal for reporting occurrence of an event in the mobile terminal 600. For example, the notification device 655 may output a signal in the form of vibration.

The haptic module 657 generates various haptic effects which may be felt by the user. A typical example of the haptic effects generated by the haptic module 657 is vibration.

The memory 660 may store a program for processing and control of the controller 670, and functions to temporarily store input data or output data (e.g., a phonebook, a message, a still image, a moving image, or the like).

The interface 625 serves as an interface for all devices connected to the mobile terminal 600. The interface 625 may serve to receive data or power from external devices and transfer the same to the internal constituents of the mobile terminal 600 and to transmit data from the mobile terminal 600 to external devices.

The controller 670 typically controls operations of the aforementioned respective elements, thereby controlling overall operation of the mobile terminal. For example, the controller 670 may perform control or processing related to voice communication, data communication, video communication, and the like. The controller 670 may also include a multimedia playback module 681 to reproduce multimedia. The multimedia playback module 681 may be provided in the controller 670 as hardware or may be configured separately from the controller 670.

The power supply 690 supplies power necessary for operations of the respective constituents according to control of the controller 670 when external power or internal power is applied thereto.

The block diagram of the mobile terminal 600 illustrated in FIG. 5 is simply illustrative. The respective constituents of the block diagram may be integrated, added or omitted according to the specifications of the mobile terminal 600. That is, two or more constituents may be combined into one constituent, or one constituent may be subdivided into two or more constituents, when necessary. In addition, the function performed in each block is simply illustrative, and it should be noted that specified operations or devices of the blocks do not limit the scope of the present disclosure.

Figure 6:
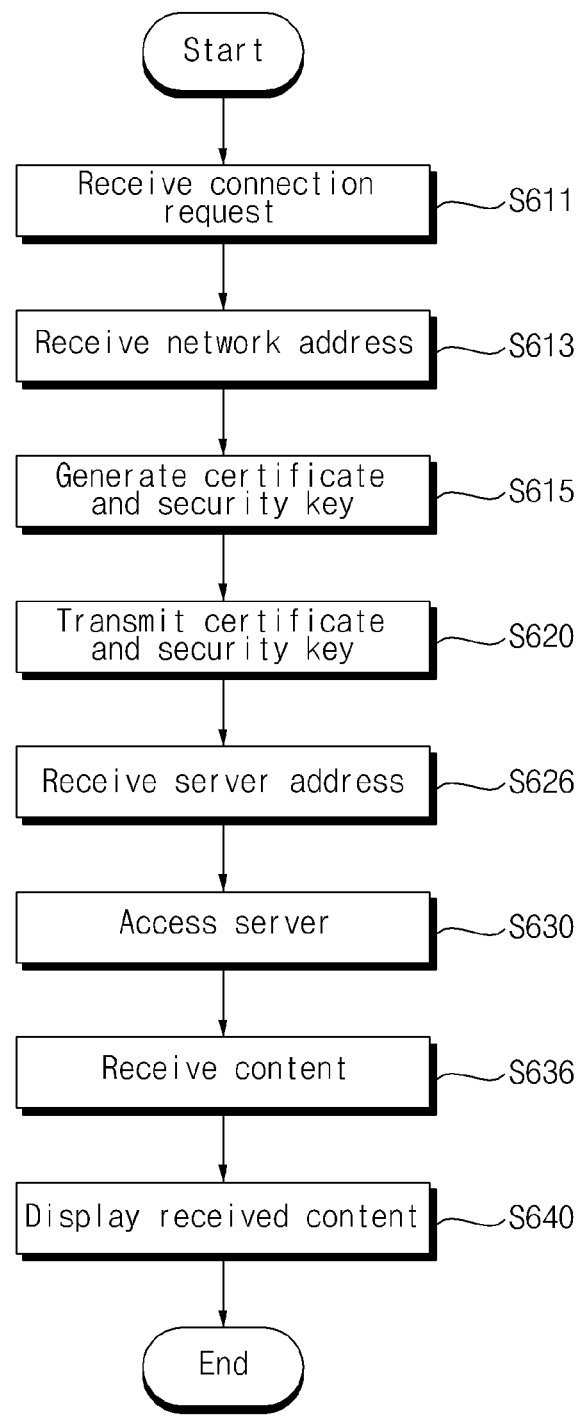
FIG. 6 is a flowchart illustrating an example of an operation method of an image display apparatus according to one embodiment of the present disclosure.

FIG. 6 is a flowchart illustrating an example of an operation method of an image display apparatus according to one embodiment of the present disclosure.

Referring to the drawing, a network interface 135 in the image display apparatus 100 according to one embodiment of the present disclosure receives a connection request from the mobile terminal 600 (S611).

For example, the image display apparatus 100 according to one embodiment of the present disclosure may receive a connection request from the mobile terminal 600 when a sharing item of a content displayed in a display 680 is selected or when a sharing application is executed, in the mobile terminal 600.

In addition, the network interface 135 in the image display apparatus 100 receives a network address of the mobile terminal 600 (S613).

For example, the network interface 135 in the image display apparatus 100 may receive the connection request jointly with the network address of the mobile terminal 600 when receiving the connection request from the mobile terminal 600.

In this case, the network address of the mobile terminal 600 may be a network address allocated by the access point apparatus 500 accessed by the mobile terminal 600.

For example, the network address of the mobile terminal 600 may be 192.168.0.2.

Next, the signal processing device 170 in the image display apparatus 100 generates a certificate and a security key based on a network address of the mobile terminal 600 (S615). In this case, the security key may include a private key.

Meanwhile, the signal processing device 170 in the image display apparatus 100 may generate a certificate including a plurality of network addresses including the network address of the mobile terminal 600 when generating the certificate.

Specifically, the signal processing device 170 in the image display apparatus 100 may generate the certificate including the plurality of network addresses by specifying the plurality of network addresses to subject alt name in the certificate.

For example, the signal processing device 170 in the image display apparatus 100 may generate a certificate including a plurality of network addresses including 192.168.0.1 to 192.168.0.199 including 192.168.0.2 when the network address of the mobile terminal 600 is 192.168.0.2.

As another example, the signal processing device 170 in the image display apparatus 100 may generate a certificate including a plurality of network addresses including 192.168.0.200 to 192.168.0.255 including 192.168.0.201 when the network address of the mobile terminal 600 is 192.168.0.201.

As such, the plurality of network addresses is included in the certificate, so even though the network address of the mobile terminal 600 is thereafter varied within a similar range, the certificate may not be separately generated, so efficient certificate management may be performed.

Next, the signal processing device 170 in the image display apparatus 100 is configured to transmit the generated certificate and security key to the mobile terminal 600 through the network interface 135 (S620).

The mobile terminal 600 executes the server for sharing the content by using the certificate and security key generated by the image display apparatus 100.

As such, since the mobile terminal 600 and the image display apparatus 100 exchange respective information to execute the server, the certificate may be dynamically generated. Accordingly, the security may be strengthened between the mobile terminal 600 and the image display apparatus 100.

In this case, the server may include a hypertext transfer protocol secure server. As such, the mobile terminal 600 executes the HTTPS server to strengthen the security when sharing the content.

The mobile terminal 600 transmits a server address of the server to the image display apparatus 100 after executing the server.

In response thereto, the image display apparatus 100 receives the server address of the server for sharing the content from the mobile terminal 600 (S626).

Meanwhile, the server address may include the network address of the mobile terminal.

For example, when the network address of the mobile terminal 600 is 192.168.0.2, the server address may be https://192.168.0.2:9999/xxx/xxx. In this case, 9999 may represent a port.

Next, the signal processing device 170 in the image display apparatus 100 is configured to access the mobile terminal 600 through the received server address through the network interface 135 (S630).

In addition, the signal processing device 170 in the image display apparatus 100 receives the content through the network interface 135 (S636).

In this case, the content may include an image, a moving picture, a text, an application, or an audio file.

Next, the signal processing device 170 in the image display apparatus 100 may be configured to display the received content (S640). Accordingly, the content may be conveniently shared between the image display apparatus 100 and the mobile terminal 600.

Figure 7:
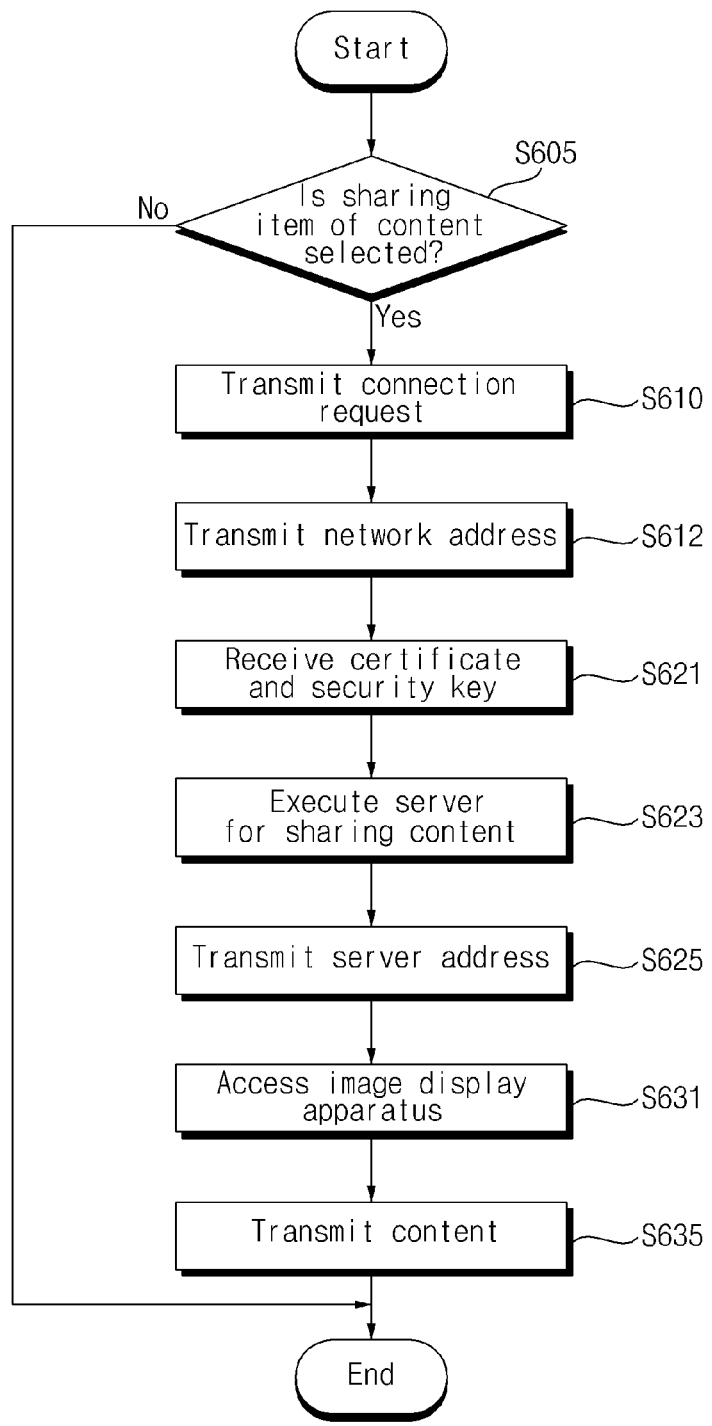
FIG. 7 is a flowchart illustrating one example of an operation method of a mobile terminal according to one embodiment of the present disclosure.

FIG. 7 is a flowchart illustrating one example of an operation method of a mobile terminal according to one embodiment of the present disclosure.

Referring to the drawing, the controller 670 of the mobile terminal 600 according to one embodiment of the present disclosure judges whether a content sharing item is selected or whether a sharing application is executed based on an input signal (S605), and the wireless transceiver 610 of the mobile terminal 600 transmits a connection request to the image display apparatus 100 for content sharing (S610).

In response thereto, the image display apparatus 100 receives the connection request from the mobile terminal 600.

Meanwhile, the wireless transceiver 610 of the mobile terminal 600 transmits a network address of the mobile terminal 600 to the image display apparatus 100 (S612).

For example, the wireless transceiver 610 of the mobile terminal 600 may transmit the network address of the mobile terminal 600 jointly when transmitting the connection request to the image display apparatus 100. In response thereto, the image display apparatus 100 receives the network address of the mobile terminal 600 from the mobile terminal 600.

In this case, the network address of the mobile terminal 600 may be a network address allocated by the access point apparatus 500 accessed by the mobile terminal 600.

For example, the network address of the mobile terminal 600 may be 192.168.0.2.

Meanwhile, the wireless transceiver 610 of the mobile terminal 600 receives the certificate and the security key generated by the image display apparatus 100 (S621). In this case, the security key may include the private key.

Meanwhile, the image display apparatus 100 may generate a certificate including a plurality of network addresses including the network address of the mobile terminal 600 when generating the certificate.

Specifically, in the case of the certificate received by the wireless transceiver 610 of the mobile terminal 600, subject alt name in the certificate may include a plurality of network addresses.

For example, the wireless transceiver 610 of the mobile terminal 600 may receive a certificate including a plurality of network addresses including 192.168.0.1 to 192.168.0.199 including 192.168.0.2 when the network address of the mobile terminal 600 is 192.168.0.2.

As another example, the wireless transceiver 610 of the mobile terminal 600 may receive a certificate including a plurality of network addresses including 192.168.0.200 to 192.168.0.255 including 192.168.0.201 when the network address of the mobile terminal 600 is 192.168.0.201.

Next, the controller 670 of the mobile terminal 600 executes a server for sharing a content after receiving the certificate and the security key (S623).

As such, since the mobile terminal 600 and the image display apparatus 100 exchange respective information to execute the server, the certificate may be dynamically generated. Accordingly, the security may be strengthened between the mobile terminal 600 and the image display apparatus 100.

In this case, the server may include a hypertext transfer protocol secure server. As such, the mobile terminal 600 executes the HTTPS server to strengthen the security when sharing the content.

Next, the wireless transceiver 610 of the mobile terminal 600 transmits a server address of the server to the image display apparatus 100 after executing the server (S625).

In response thereto, the image display apparatus 100 receives the server address of the server for sharing the content from the mobile terminal 600.

Meanwhile, the server address may include the network address of the mobile terminal.

For example, when the network address of the mobile terminal 600 is 192.168.0.2, the server address may be https://192.168.0.2:9999/xxx/xxx. In this case, 9999 may represent a port.

Next, the image display apparatus 100 accesses the mobile terminal 600 through the received server address.

In response thereto, the mobile terminal 600 performs wireless access to the image display apparatus 100 based on the server address (S631).

In addition, the controller 670 of the mobile terminal 600 transmits a content to the wirelessly accessed image display apparatus 100 (S635). Accordingly, the content may be conveniently shared between the image display apparatus 100 and the mobile terminal 600.

In this case, the content may include an image, a moving picture, a text, an application, or an audio file.

FIGS. 8A to 11D are diagrams referred to for description of the operation method of FIG. 6 or 7.

Figure 8A:
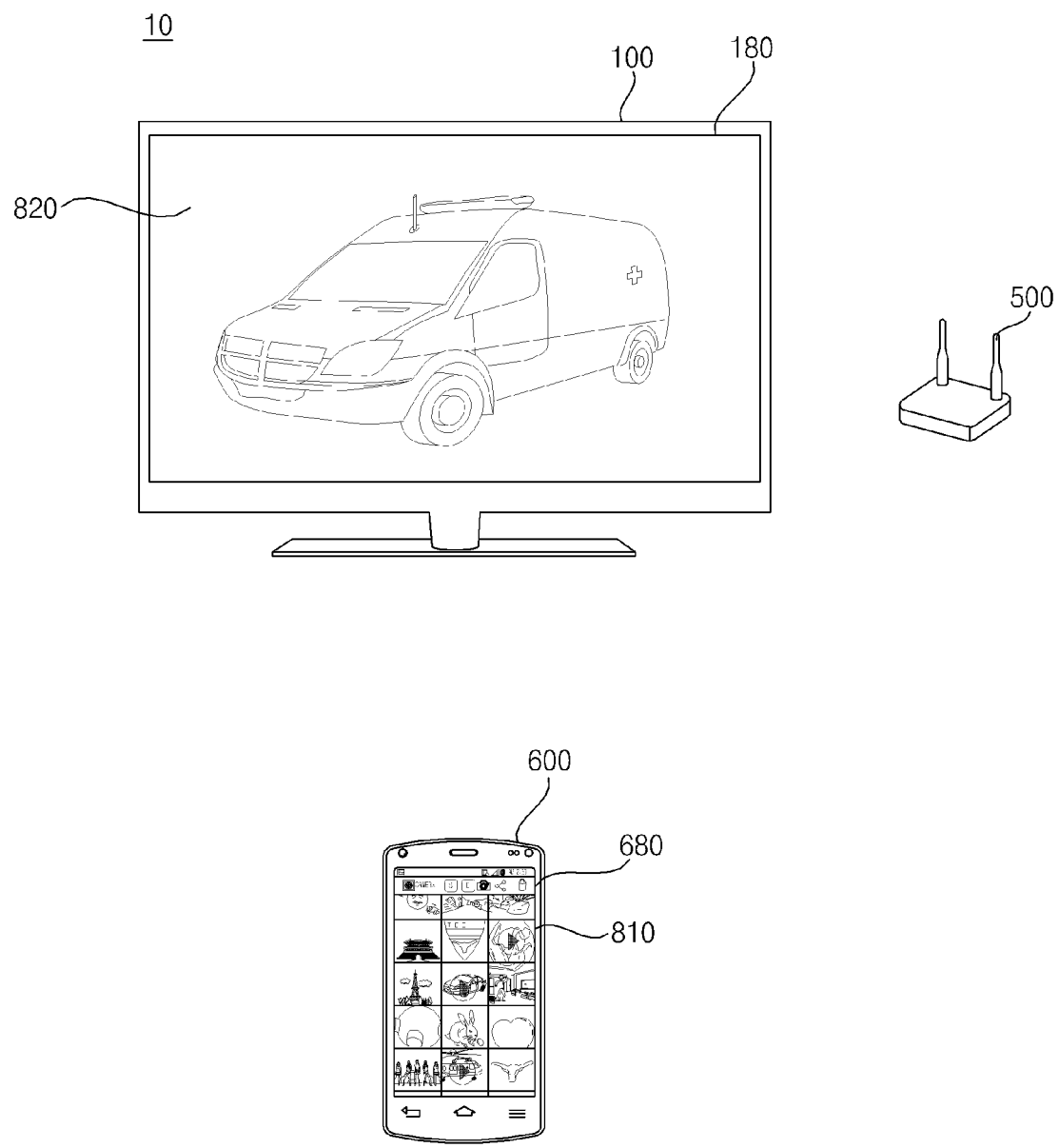
FIGS. 8A to 11D are diagrams referred to for description of the operation method of FIG. 6 or 7.

FIG. 8A illustrates that a gallery screen 810 is displayed on the display 680 of the mobile terminal 600 in a state in which a predetermined image 820 is displayed in the display 180 of the image display apparatus 100.

The gallery screen 810 may include a plurality of images or moving pictures.

Meanwhile, the access point apparatus 500 may allocate a network address for the network access of the mobile terminal 600.

For example, the network address of the mobile terminal 600 may be 192.168.0.2.

Figure 8B:
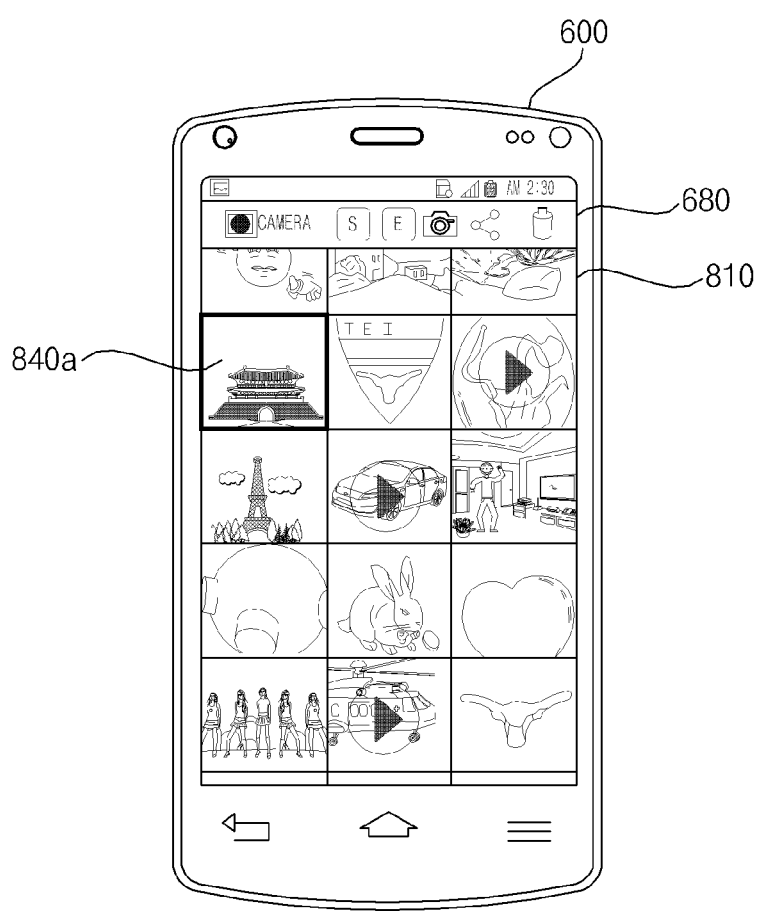

FIG. 8B illustrates that a first image item 840a in the gallery screen 810 in the mobile terminal 600 is focused.

The controller 670 of the mobile terminal 600 may be configured to the first image item 840a to be focused and displayed when the first image item 840a is selected in the gallery screen 810.

Figure 8C:
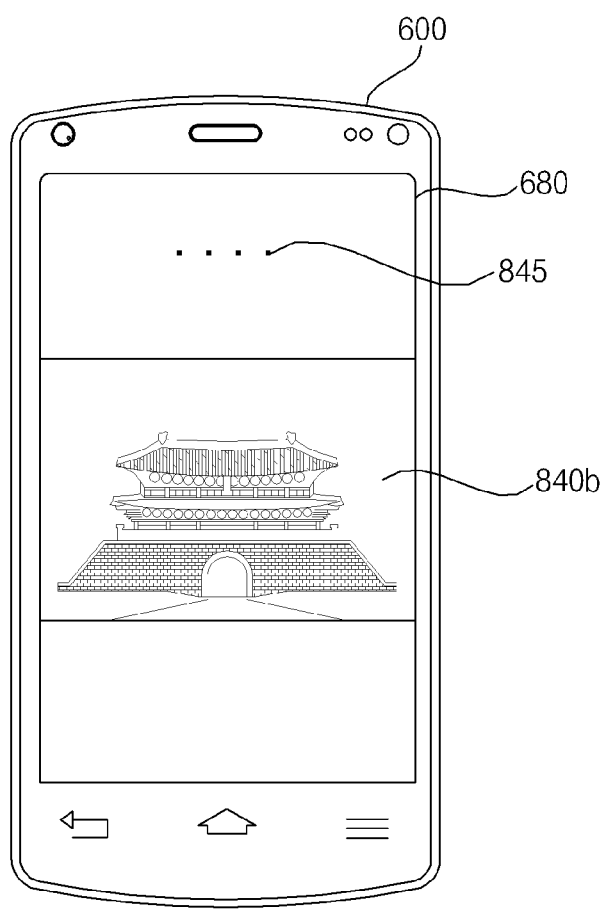

Next, FIG. 8C illustrates that a first image 840b corresponding to first image item 840a in the gallery screen 810 in the mobile terminal 600 is displayed.

Referring to the drawing, the controller 670 of the mobile terminal 600 may be configured to the first image 840b corresponding to the first image item 840a to be displayed in the display 680 when the first image item 840a is selected in the gallery screen 810.

In this case, the controller 670 of the mobile terminal 600 may be configured to a menu item 845 for sharing to be displayed in addition to the first image 840b.

Figure 8D:
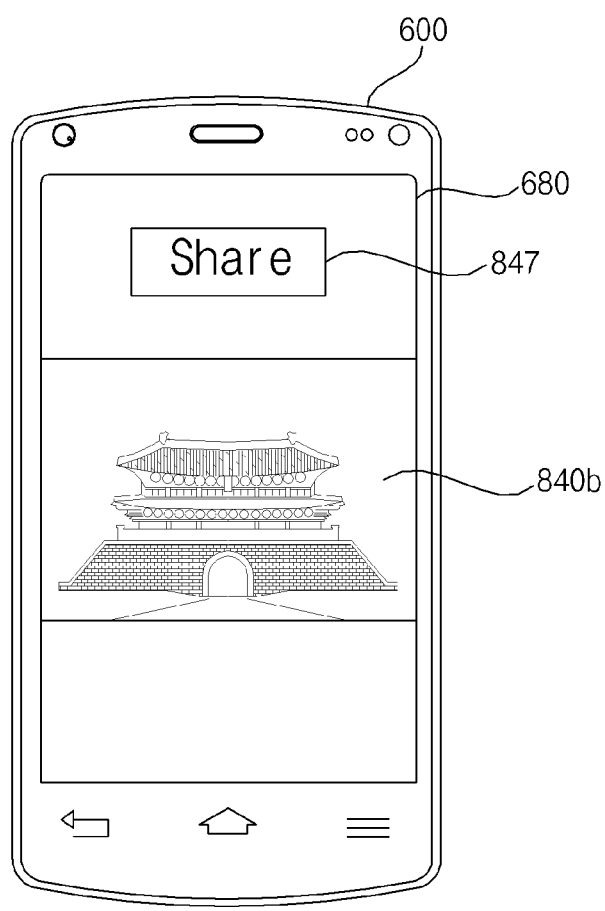

When the menu item 845 is selected, the controller 670 of the mobile terminal 600 may be configured to a sharing item 847 to be displayed in the display 680 as illustrated in FIG. 8D.

FIG. 8D illustrates that the first image 840b and the sharing item 847 are displayed in the display 680.

Next, the controller 670 of the mobile terminal 600 may be configured to at least one of the sharing application items 849a to 849d to be displayed when the sharing item 847 is selected.

Figure 8E:
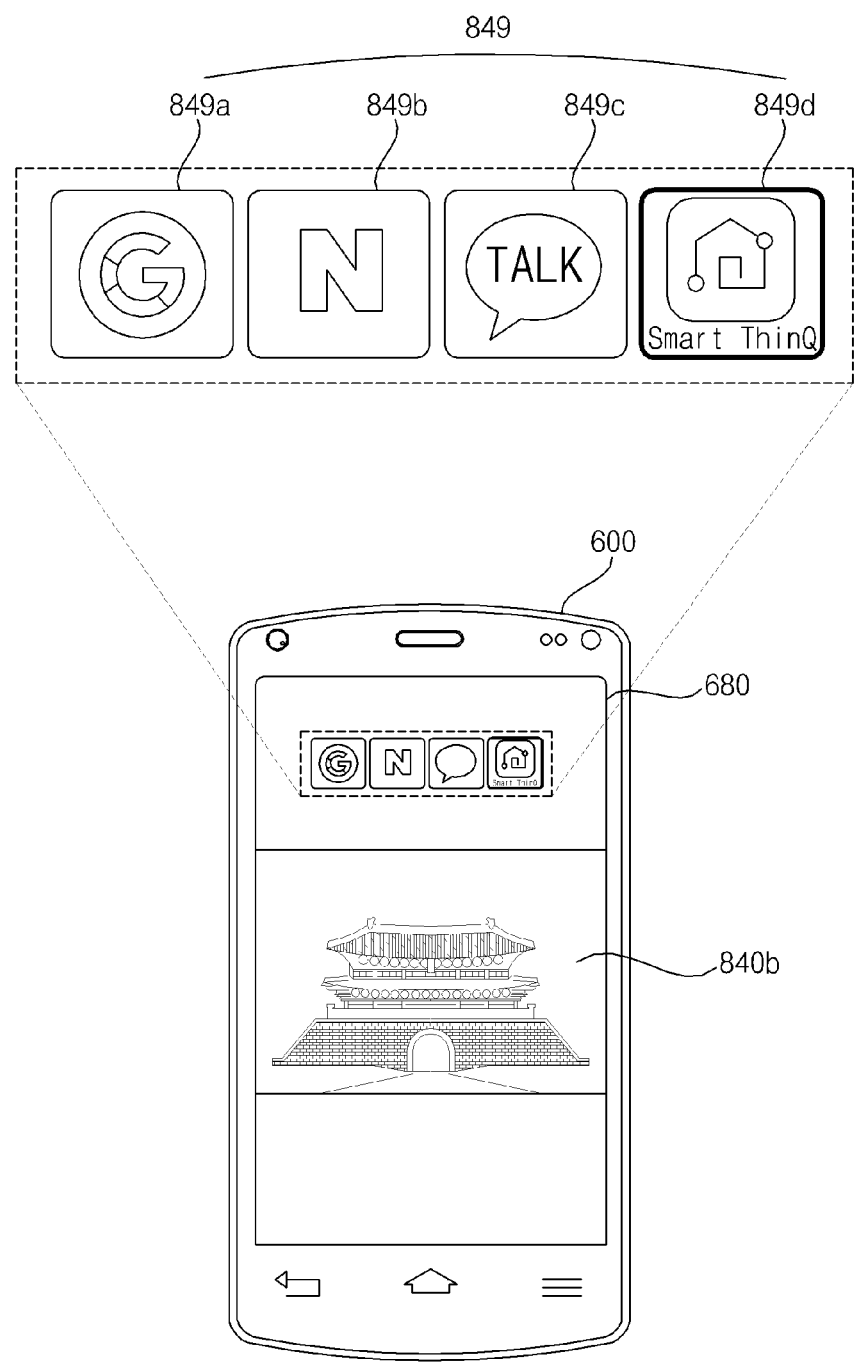

FIG. 8E illustrates that the first image 840b and the sharing application items 849a to 849d are displayed in the display 680.

Meanwhile, when any one sharing application item 849d is selected among the sharing application item 849a to 849d, the controller 670 of the mobile terminal 600 may be configured to the sharing application to be executed.

In this case, the sharing application may be an application for sharing the content with the image display apparatus 100. For example, the sharing application may be a ThinQ application.

Meanwhile, as the sharing application in the mobile terminal is executed, the controller 670 of the mobile terminal 600 transmits, to the image display apparatus 100, a connection request to the mobile terminal 600. This is described with reference to FIG. 9A.

Figure 9A:
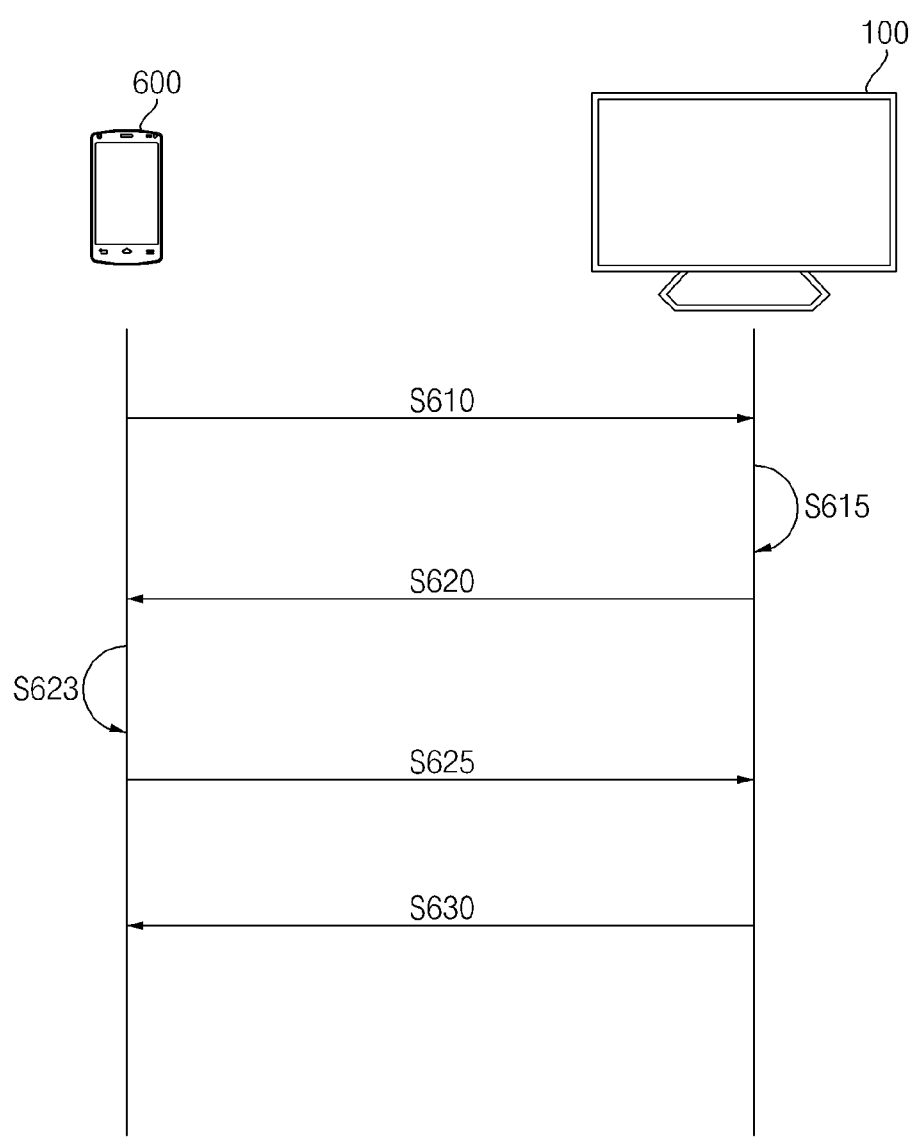

FIG. 9A is a diagram illustrating a signal flow between the mobile terminal 600 and the image display apparatus 100.

Referring to the drawing, the controller 670 of the mobile terminal 600 transmits the connection request and the network address to the image display apparatus 100 based on selection of the content sharing item or execution of the sharing application (S610).

In response thereto, the image display apparatus 100 receives the connection request and the network address from the mobile terminal 600.

Next, the signal processing device 170 in the image display apparatus 100 generates a certificate and a security key based on the network address of the mobile terminal 600 (S615).

Meanwhile, the signal processing device 170 in the image display apparatus 100 may generate a certificate including a plurality of network addresses including the network address of the mobile terminal 600 when generating the certificate.

Specifically, the signal processing device 170 in the image display apparatus 100 may generate the certificate including the plurality of network addresses by specifying the plurality of network addresses to subject alt name in the certificate.

Next, the image display apparatus 100 transmits the generated certificate and security key to the mobile terminal 600 (620).

Next, the mobile terminal 600 executes a server for sharing content after receiving the certificate and the security key (S623). As such, since the mobile terminal 600 and the image display apparatus 100 exchange respective information to execute the server, the certificate may be dynamically generated.

Next, the wireless transceiver 610 of the mobile terminal 600 transmits a server address of the server to the image display apparatus 100 after executing the server (S625).

Meanwhile, the server address may include the network address of the mobile terminal.

For example, when the network address of the mobile terminal 600 is 192.168.0.2, the server address may be https://192.168.0.2:9999/xxx/xxx.

Next, the image display apparatus 100 accesses the mobile terminal 600 through the received server address through the network interface 135 (S630).

Thereafter, the mobile terminal 600 transmits the content to the image display apparatus 100, and the image display apparatus 100 receives the content from the mobile terminal 600.

Figure 9B:
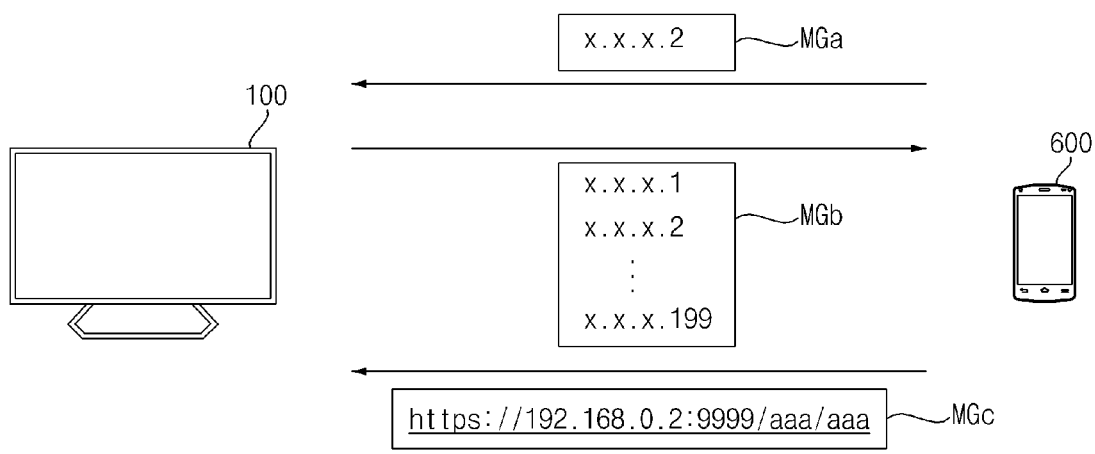

FIG. 9B is a diagram illustrating various examples of a signal between the mobile terminal 600 and the image display apparatus 100.

Referring to the drawing, a network address MGa of the mobile terminal 600 received in step S613 of FIG. 9A may be exemplified as x.x.x.2 as in the drawing.

The signal processing device 170 of the image display apparatus 100 generates a certificate MGb and a security key based on the network address MGa of the mobile terminal 600.

Meanwhile, when the network address MGa of the mobile terminal 600 is x.x.x.2, a plurality of network addresses in the certificate MGb may include x.x.x.1 to x.x.x.199.

Next, the mobile terminal 600 may execute the server based on the received certificate and security key, and transmit a server address MGc of the executed server to the image display apparatus 100.

In this case, the server address MGc may include the network address of the mobile terminal 600, and may be https://192.168.0.2:9999/aaa/aaa as in the drawing. In this case, 9999 may represent a port.

Figure 10A:
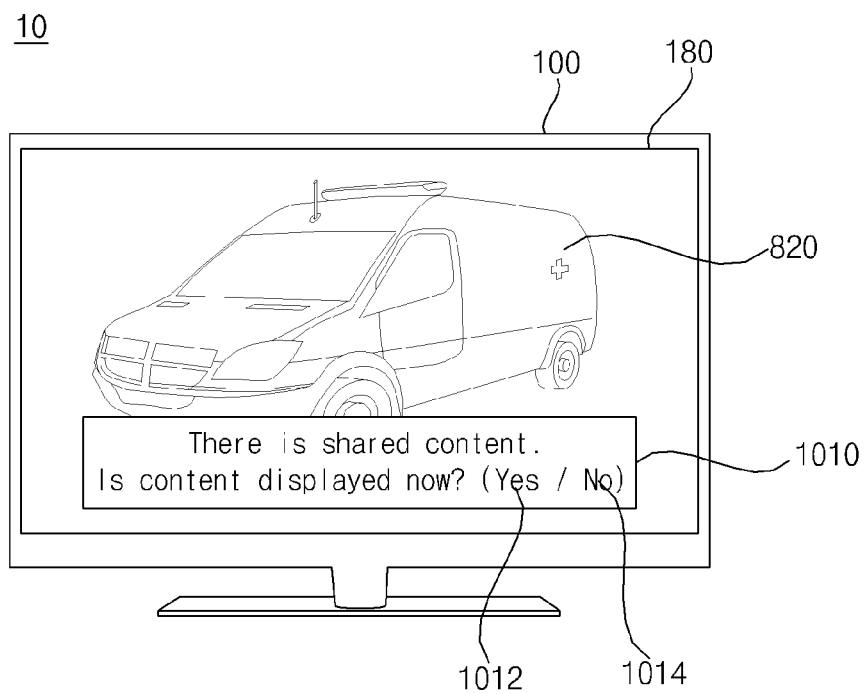
Figure 10A:
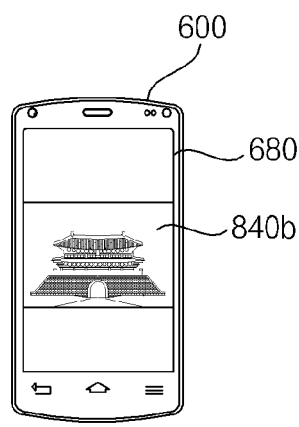

FIG. 10A illustrates that a content corresponding to the first image 840*b* is received from the mobile terminal 600 in a state in which a predetermined image 820 is displayed in the display 180 of the image display apparatus.

Referring to the drawing, when the signal processing device 170 of the image display apparatus 100 receives the sharing content through the network interface 135, the signal processing device 170 may be configured to an object 1010 indicating whether to immediately display the sharing content to be displayed.

Figure 10B:
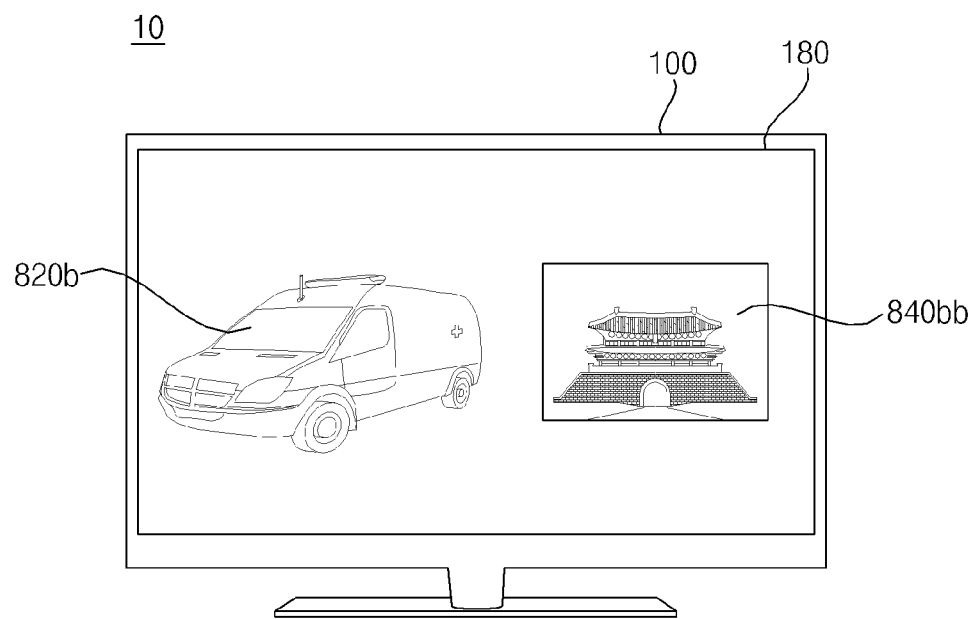
Figure 10B:
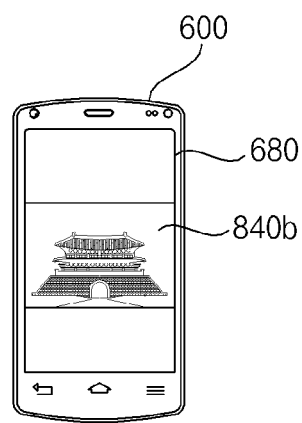

Meanwhile, when a display item 1012 is selected in the object 1010, the signal processing device 170 of the image display apparatus 100 may be configured to a reduced predetermined image 820*b* and a sharing content image 840*bb* to be displayed in the display 180 as illustrated in FIG. 10B.

In this case, the first image 840*b* may be displayed in the display 680 of the mobile terminal 600 as it is.

Figure 10C:
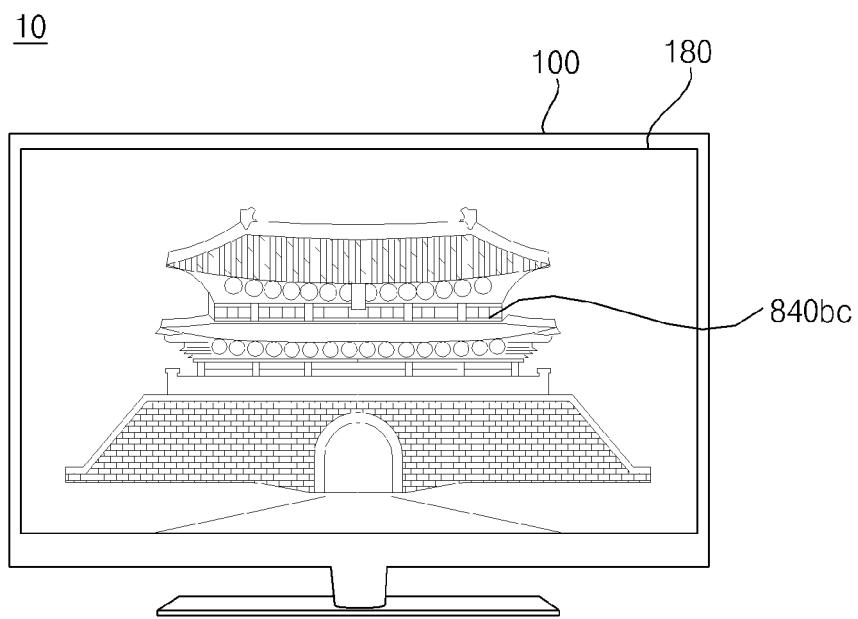
Figure 10C:
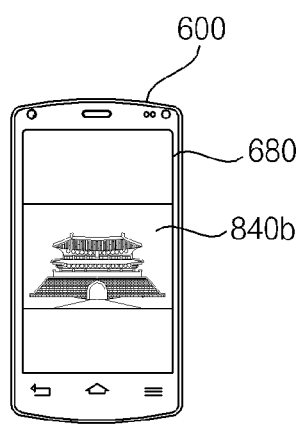

Meanwhile, when the display item 1012 is selected in the object 1010, the signal processing device 170 of the image display apparatus 100 may be configured to a predetermined image 820 to disappear and a sharing content image 840*bc* to be displayed in the display 180 as illustrated in FIG. 10C, unlike FIG. 10B. Accordingly, the sharing content may be conveniently displayed in the image display apparatus 100.

In this case, the first image 840*b* may be displayed in the display 680 of the mobile terminal 600 as it is as illustrated in FIG. 10C.

Figure 10D:
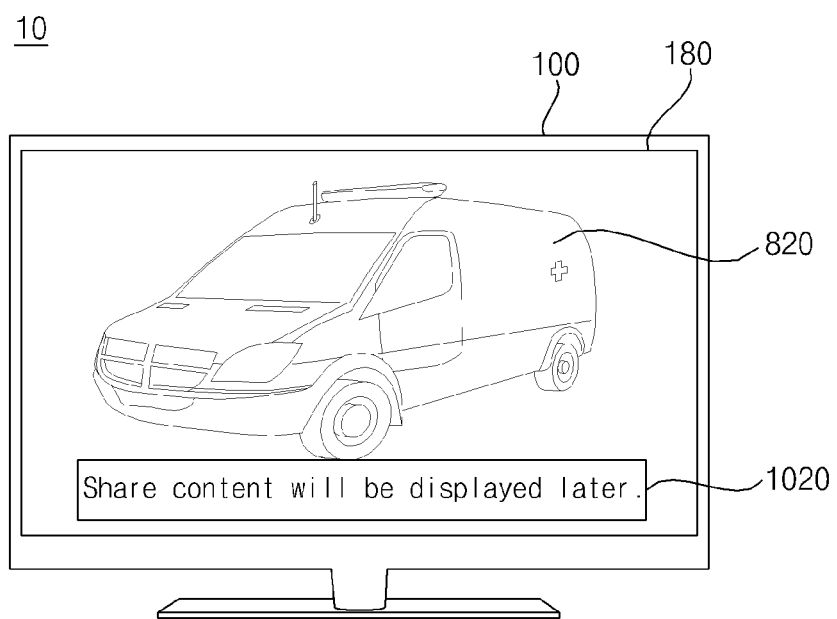
Figure 10D:
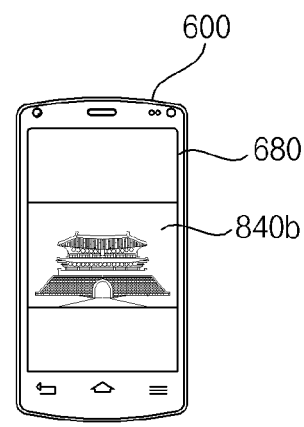

Meanwhile, when a display item 1014 is selected in the object 1010 of FIG. 10A afterwards, the signal processing device 170 of the image display apparatus 100 may be configured to the predetermined image 820, and an object 1020 representing a display afterwards to be displayed as illustrated in FIG. 10D.

FIGS. 10A to 10D illustrate that the first image 840*b* is displayed in the display 680 of the mobile terminal 600 as it is. In particular, FIGS. 10B and 10C may be implemented in a similar scheme to mirroring when a content corresponding to the first image 840*b* is displayed in the image display apparatus while the first image 840*b* is displayed in the display 680 of the mobile terminal 600.

Meanwhile, unlike FIGS. 10A to 10D, in one embodiment of the present disclosure, since the server is executed when executing the sharing application for content sharing, it is also possible to display another image in the display 680 of the mobile terminal 600. This will be described with reference to FIGS. 11A to 11D.

Figure 11A:
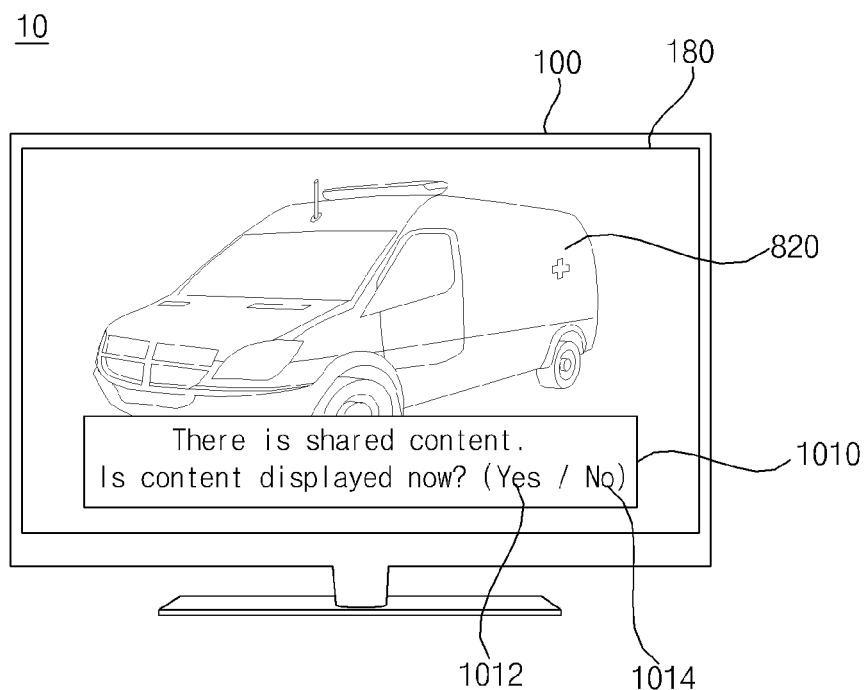
Figure 11A:
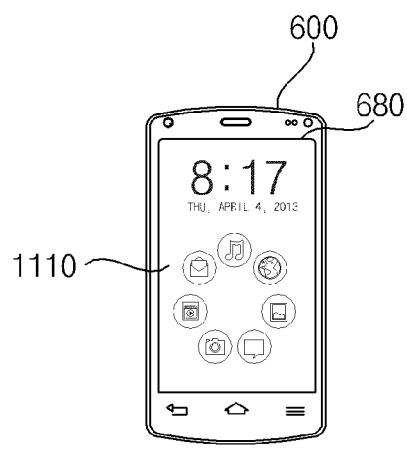

FIG. 11A illustrates that a content corresponding to the first image 840*b* is received from the mobile terminal 600 in a state in which a predetermined image 820 is displayed in the display 180 of the image display apparatus.

Referring to the drawing, when the signal processing device 170 of the image display apparatus 100 receives the sharing content through the network interface 135, the signal processing device 170 may be configured to an object 1010 indicating whether to immediately display the sharing content to be displayed.

In this case, a home screen 1110 other than the first image 840*b* may be displayed in the display 680 of the mobile terminal 600.

Figure 11B:
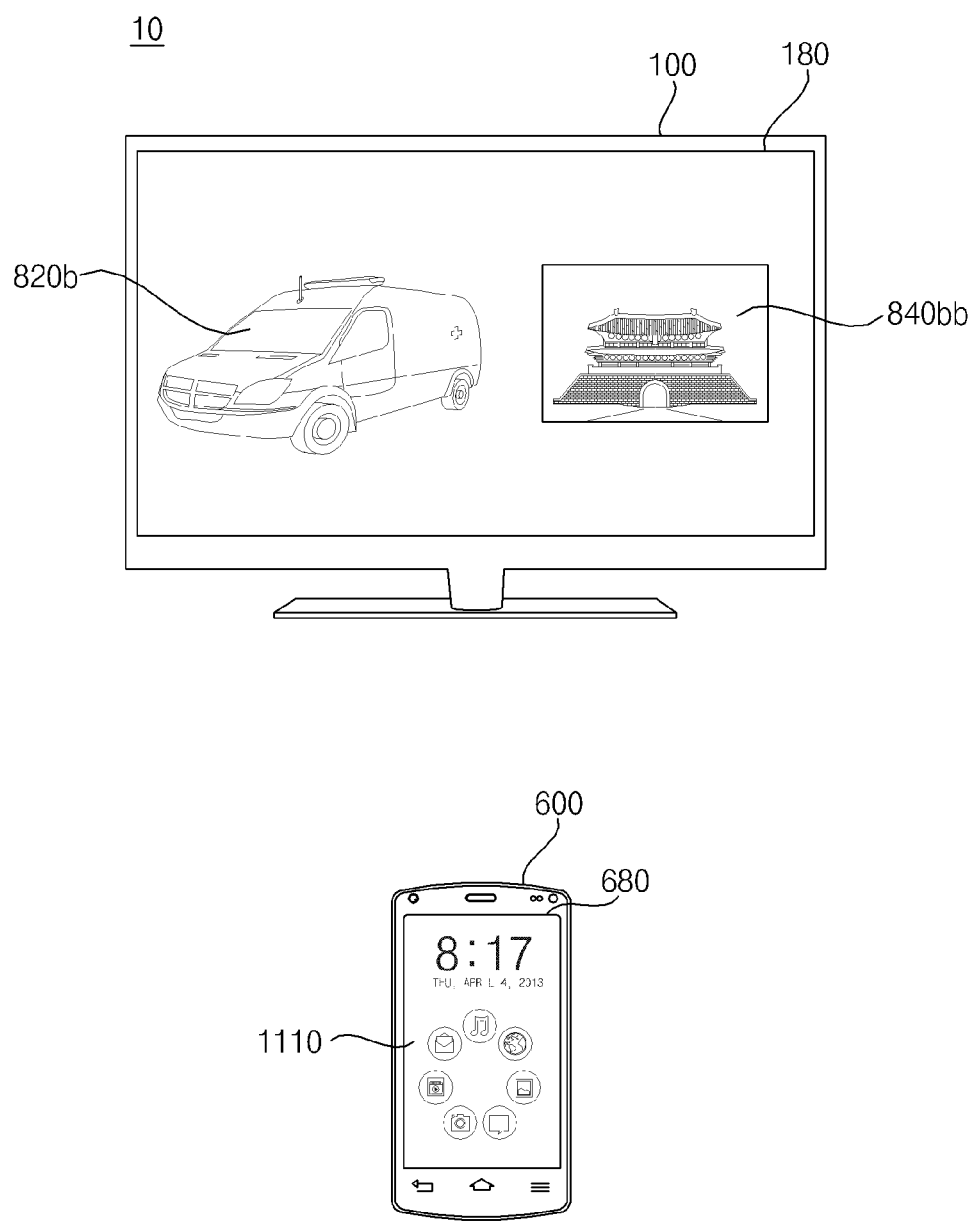

Meanwhile, when the display item 1012 is selected in the object 1010, the signal processing device 170 of the image display apparatus 100 may be configured to the reduced predetermined image 820*b* and the sharing content image 840*bb* to be displayed in the display 180 as illustrated in FIG. 11B.

In this case, the home screen 1110 other than the first image 840*b* may be displayed in the display 680 of the mobile terminal 600.

Figure 11C:
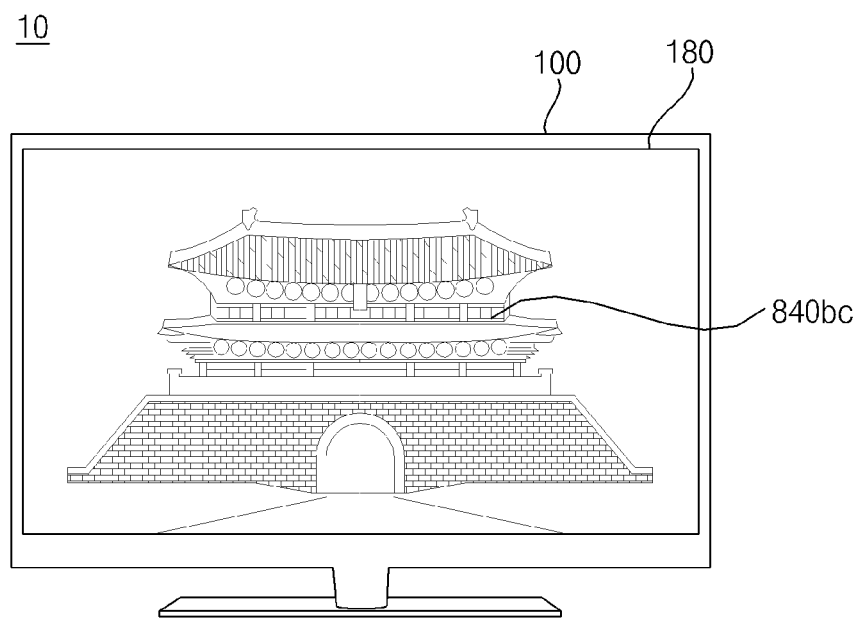
Figure 11C:
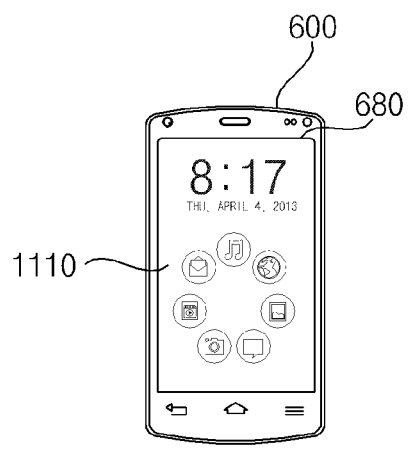

Meanwhile, when the display item 1012 is selected in the object 1010, the signal processing device 170 of the image display apparatus 100 may be configured to the predetermined image 820 to be disappeared and a sharing content image 840*cc* to be displayed in the display 180 as illustrated in FIG. 11C, unlike FIG. 11B. Accordingly, the sharing content may be conveniently displayed in the image display apparatus 100.

In this case, the home screen 1110 other than the first image 840*b* may be displayed in the display 680 of the mobile terminal 600 as illustrated in FIG. 11C.

Figure 11D:
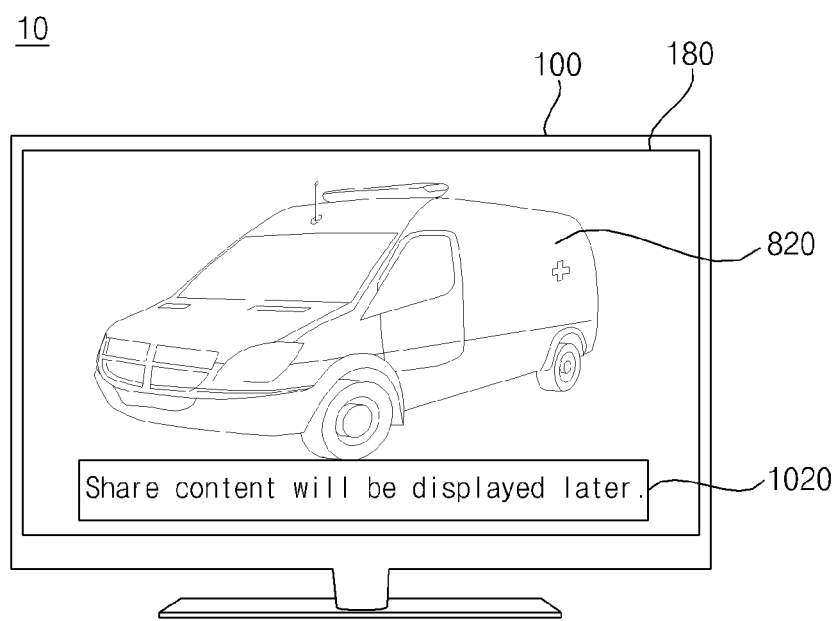
Figure 11D:
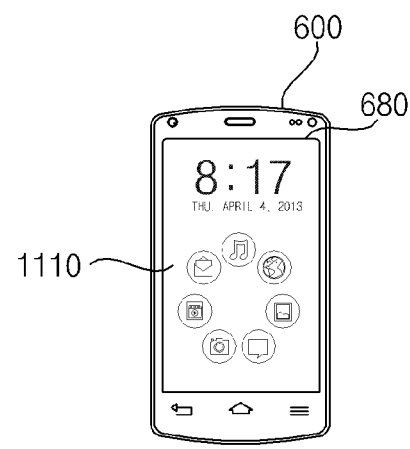

Meanwhile, when the display item 1014 is selected in the object 1010 of FIG. 11A afterwards, the signal processing device 170 of the image display apparatus 100 may be configured to the predetermined image 820, and an object 1020 representing the display afterwards to be displayed in the display 180 as illustrated in FIG. 11D.

In this case, the home screen 1110 other than the first image 840*b* may be displayed in the display 680 of the mobile terminal 600.

As illustrated in FIGS. 11A to 11D, since the server for content sharing is executed in the mobile terminal 600, the mobile terminal 600 has an advantage of being capable of another screen while transmitting the sharing content.

Figure 12:
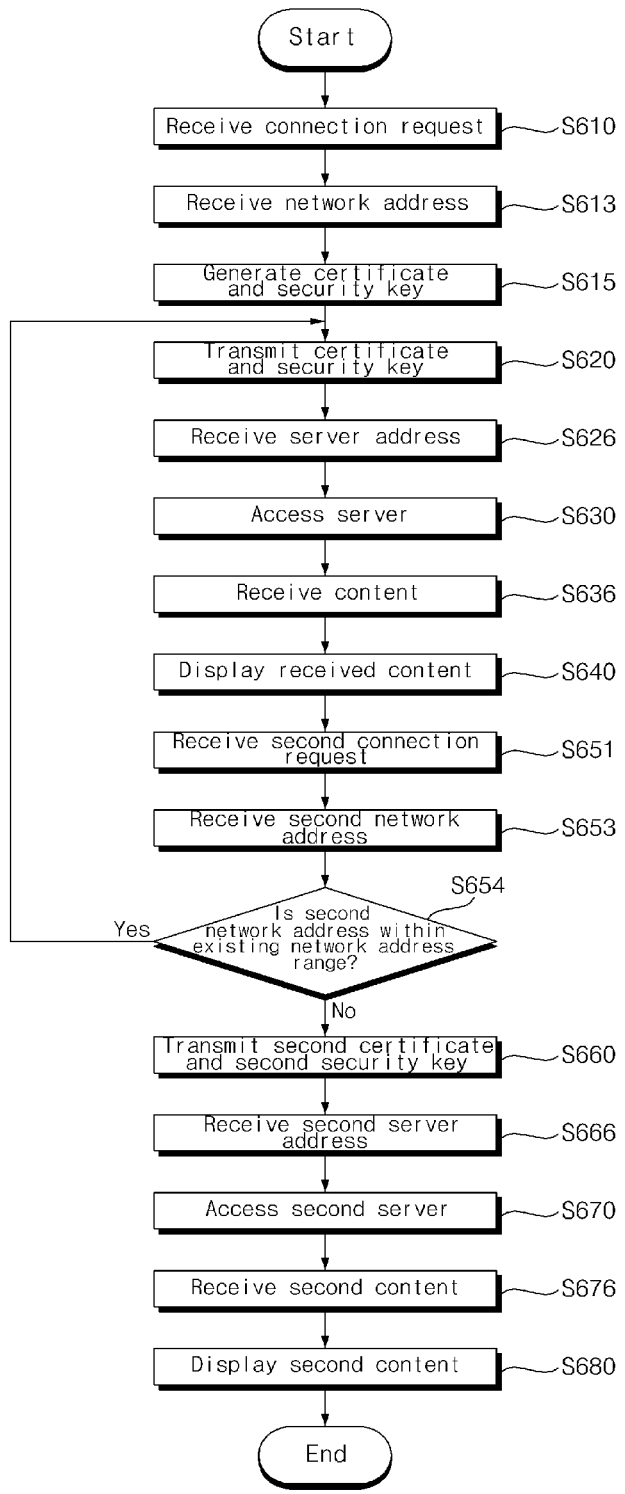
FIG. 12 is a flowchart illustrating an example of an operation method of an image display apparatus according to another embodiment of the present disclosure.

FIG. 12 is a flowchart illustrating an example of an operation method of an image display apparatus according to another embodiment of the present disclosure.

Referring to the drawing, the operation method of FIG. 12 is similar to the operation method of FIG. 6. That is, in the operation method of FIG. 12, steps S610 to S640 are the same as the steps of FIG. 6, however, both operation methods are different in that steps after step S651 are further executed.

Accordingly, the description of steps 610 to S640 is omitted by referring to the description of FIG. 6.

The network interface 135 in the image display apparatus 100 according to one embodiment of the present disclosure may receive a second connection request from the mobile terminal 600 after the wireless access to the mobile terminal 600 is terminated after step S640 (S651).

In addition, the network interface 135 in the image display apparatus 100 receives a second network address of the mobile terminal 600 (S613).

Next, the signal processing device 170 in the image display apparatus 100 judges whether the received second network address is included in the plurality of network addresses in the certificate generated in step S615 (S654).

For example, the second network address of the mobile terminal 600 may be 192.168.0.4, and the plurality of network addresses may be 192.168.0.1 to 192.168.0.199.

In the corresponding case, the signal processing device 170 in the image display apparatus 100 may be configured to transmit the pre-generated certificate and security key to the mobile terminal 600. That is, the signal process device 170 may be configured to step S620 to be performed.

Meanwhile, unlike the drawing, when the received second network address is included in the plurality of network addresses in the certificate generated in step S615, the signal processing device 170 in the image display apparatus 100 accesses the server of the mobile terminal 600 based on the server address of the server without additional transmission of the certificate and the security key to the mobile terminal 600 to receive a content from the mobile terminal 600. Accordingly, the certificate may be conveniently dynamically generated when the second network address is received.

Meanwhile, when the received second network address is not included in the plurality of network addresses in the certificate generated in step S615, the signal processing device 170 in the image display apparatus 100 may generate a second certificate and a second security key based on the network address of the mobile terminal 600, and transmit the generated second certificate and second security key to the mobile terminal (S660).

For example, the second network address of the mobile terminal 600 may be 192.170.1.4, and the plurality of network addresses in the pre-generated certificate may be 192.168.0.1 to 192.168.0.199.

Meanwhile, the signal processing device 170 in the image display apparatus 100 may generate the second certificate including the plurality of network addresses including the second network address of the mobile terminal 600 when generating the second certificate.

Specifically, the signal processing device 170 in the image display apparatus 100 may generate the second certificate including the plurality of network addresses by specifying the plurality of network addresses to subject alt name in the second certificate. Accordingly, the second certificate different from the existing generated certificate may be dynamically generated when the second network address is received.

For example, the signal processing device 170 in the image display apparatus 100 may generate a second certificate including a plurality of network addresses including 92.170.1.1 to 92.170.1.199 including 192.170.1.4 when the network address of the mobile terminal 600 is 192.170.1.4.

As such, the plurality of network addresses is included in the second certificate, so even though the second network address of the mobile terminal 600 is thereafter varied within a similar range, the certificate may not be separately generated, so efficient certificate management may be performed.

Meanwhile, the mobile terminal 600 executes a second server for sharing the content by using the second certificate and the second security key generated by the image display apparatus 100.

As such, since the mobile terminal 600 and the image display apparatus 100 exchange respective information to execute the second server, the certificate may be dynamically generated. Accordingly, the security may be strengthened between the mobile terminal 600 and the image display apparatus 100.

In this case, the second server may include the hypertext transfer protocol secure server. As such, the mobile terminal 600 executes the HTTPS server to strengthen the security when sharing the content.

The mobile terminal 600 transmits a second server address of the second server to the image display apparatus 100 after executing the second server.

In response thereto, the image display apparatus 100 receives the second server address of the second server for sharing the content from the mobile terminal 600 (S666).

Meanwhile, the second server address may include a second network address of the mobile terminal 600.

For example, when the second network address of the mobile terminal 600 is 192.170.1.4, the server address may be https://192.170.1.4:8888/bbb/bbb. In this case, 8888 may represent the port.

Next, the signal processing device 170 in the image display apparatus 100 is configured to access the mobile terminal 600 through the received second server address through the network interface 135 (S670).

In addition, the signal processing device 170 in the image display apparatus 100 receives a second content through the network interface 135 (S676).

In this case, the second content may include an image, a moving picture, a text, an application, or an audio file.

Next, the signal processing device 170 in the image display apparatus 100 may be configured to display the received second content (S680). Accordingly, the content may be conveniently shared between the image display apparatus 100 and the mobile terminal 600.

Meanwhile, it is also possible to perform step S651 to S680 by receiving the second connection request from the second mobile terminal 600 other than the mobile terminal 600. This will be described below with reference to FIG. 13B.

FIGS. 13A to 15 are diagrams referred to for description of the operation method of FIG. 12.

Figure 13A:
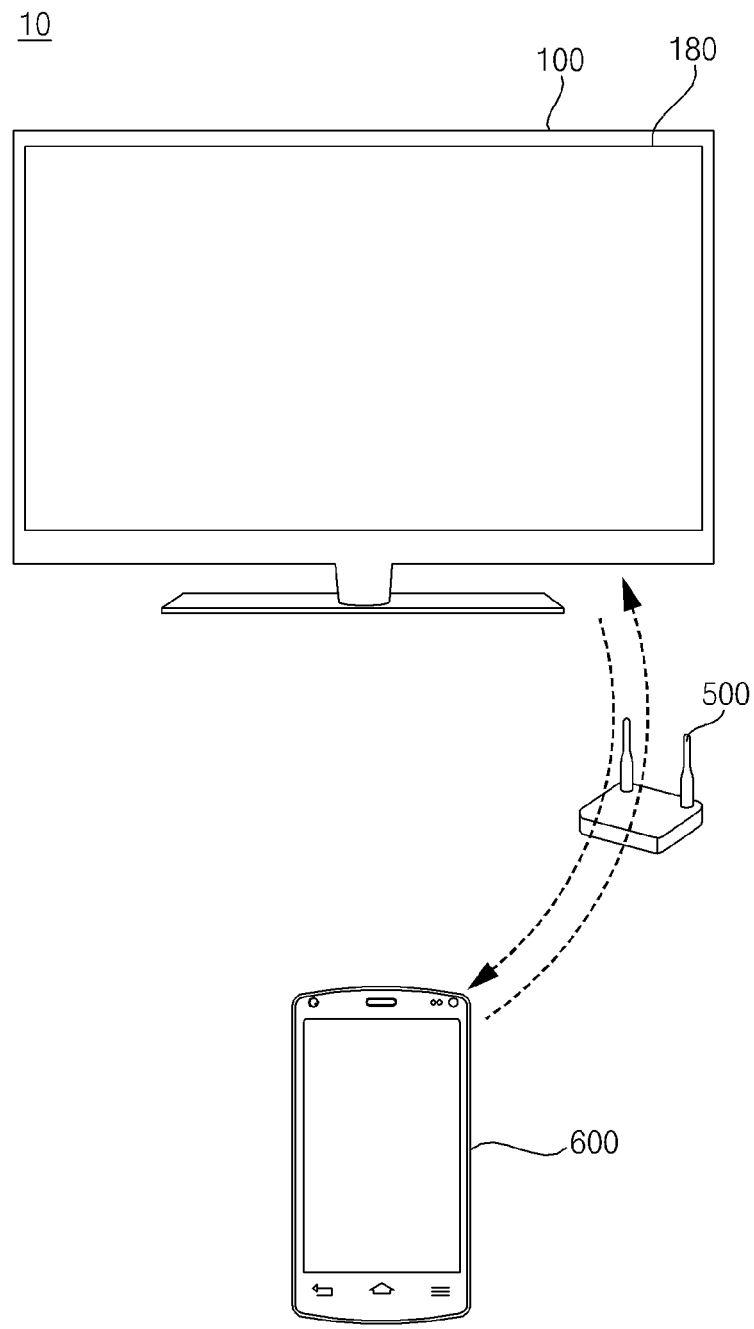
FIGS. 13A to 15 are diagrams referred to for description of the operation method of FIG. 12.

FIG. 13A illustrates that steps S610 to S680 of FIG. 12 are performed between the image display apparatus 100 and the same mobile terminal 600.

Figure 13B:
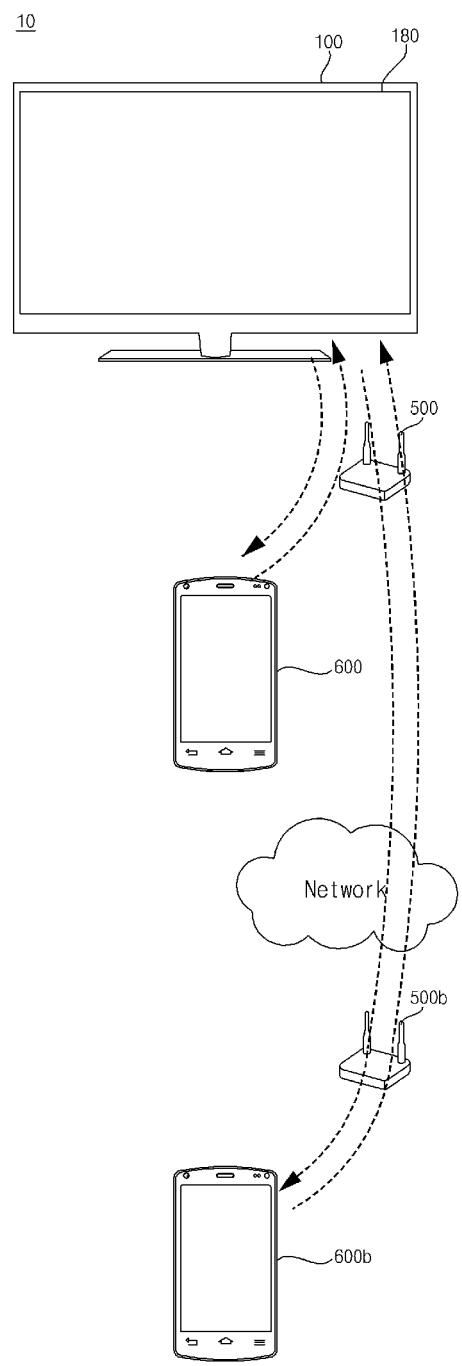

FIG. 13B illustrates that among steps S610 to S680 of FIG. 12, steps S610 to S640 are performed between the image display apparatus 100 and the mobile terminal 600, and step S651 to S680 are performed between the image display apparatus 100 and a second mobile terminal 600b.

The network interface 135 in the image display apparatus 100 according to one embodiment of the present disclosure may receive a second connection request from the second mobile terminal 600b after the wireless access to the mobile terminal 600 is terminated after step S640 of FIG. 12 (S651).

In addition, the network interface 135 in the image display apparatus 100 may receive a second network address of the second mobile terminal 600b (S613).

Next, the signal processing device 170 in the image display apparatus 100 judges whether the received second network address is included in the plurality of network addresses in the certificate generated in step S615 (S654).

For example, the second network address of the second mobile terminal 600b may be 192.168.0.4, and the plurality of network addresses may be 192.168.0.1 to 192.168.0.199.

In the corresponding case, the signal processing device 170 in the image display apparatus 100 may be configured to transmit the pre-generated certificate and security key to the second mobile terminal 600b. That is, the signal process device 170 may be configured to step S620 to be performed.

Meanwhile, when the received second network address is not included in the plurality of network addresses in the certificate generated in step S615, the signal processing device 170 in the image display apparatus 100 may generate a second certificate and a second security key based on the network address of the second mobile terminal 600b, and transmit the generated second certificate and second security key to the mobile terminal (S660).

For example, the second network address of the second mobile terminal 600b may be 192.170.1.4, and the plurality of network addresses in the pre-generated certificate may be 192.168.0.1 to 192.168.0.199.

Meanwhile, the signal processing device 170 in the image display apparatus 100 may generate the second certificate including the plurality of network addresses including the second network address of the second mobile terminal 600b when generating the second certificate.

Specifically, the signal processing device 170 in the image display apparatus 100 may generate the second certificate including the plurality of network addresses by specifying the plurality of network addresses to subject alt name in the second certificate. Accordingly, the second certificate different from the existing generated certificate may be dynamically generated when the second network address is received.

For example, the signal processing device 170 in the image display apparatus 100 may generate a second certificate including a plurality of network addresses including 92.170.1.1 to 92.170.1.199 including 192.170.1.4 when the network address of the second mobile terminal 600b is 192.170.1.4.

As such, the plurality of network addresses is included in the second certificate, so even though the second network address of the second mobile terminal 600b is thereafter varied within a similar range, the certificate may not be separately generated, so efficient certificate management may be performed.

Meanwhile, unlike the drawing, when the second network address of the second mobile terminal 600b is received, it is also possible to generate the second certificate and the security key immediately without performing step S654.

Meanwhile, the second mobile terminal 600b executes a second server for sharing the contents by using the second certificate and the second security key generated by the image display apparatus 100.

As such, since the second mobile terminal 600b and the image display apparatus 100 exchange respective information to execute the second server, the certificate may be dynamically generated. Accordingly, the security may be strengthened between the second mobile terminal 600b and the image display apparatus 100.

In this case, the second server may include the hypertext transfer protocol secure server. As such, the second mobile terminal 600b executes the HTTPS server to strengthen the security when sharing the content.

The second mobile terminal 600b transmits a second server address of the second server to the image display apparatus 100 after executing the second server.

In response thereto, the image display apparatus 100 receives the second server address of the second server for sharing the contents from the second mobile terminal 600b (S666).

Meanwhile, the second server address may include the second network address of the second mobile terminal 600b.

For example, when the second network address of the second mobile terminal 600b is 192.170.1.4, the server address may be https://192.170.1.4:8888/bbb/bbb. In this case, 8888 may represent the port.

Next, the signal processing device 170 in the image display apparatus 100 is configured to access the second mobile terminal 600b through the received second server address through the network interface 135 (S670).

In addition, the signal processing device 170 in the image display apparatus 100 receives a second content through the network interface 135 (S676).

In this case, the second content may include an image, a moving picture, a text, an application, or an audio file.

Next, the signal processing device 170 in the image display apparatus 100 may be configured to display the received second content (S680). Accordingly, the content may be conveniently shared between the image display apparatus 100 and the second mobile terminal 600b.

Figure 14A:
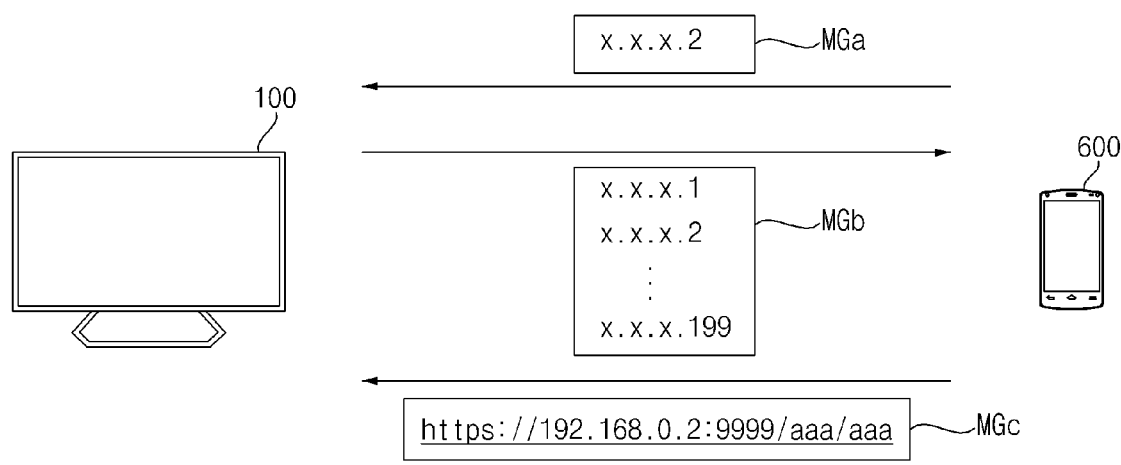

FIG. 14A is a diagram illustrating various examples of a signal between the mobile terminal 600 and the image display apparatus 100.

Referring to the drawing, a network address MGa of the mobile terminal 600 received in step S613 of FIG. 12 may be exemplified as x.x.x.2 as in the drawing.

The signal processing device 170 of the image display apparatus 100 generates a certificate MGb and a security key based on the network address MGa of the mobile terminal 600.

Meanwhile, when the network address MGa of the mobile terminal 600 is x.x.x.2, a plurality of network addresses in the certificate MGb may include x.x.x.1 to x.x.x.199.

Next, the mobile terminal 600 may execute the server based on the received certificate and security key, and transmit a server address MGc of the executed server to the image display apparatus 100.

In this case, the server address MGc may include the network address of the mobile terminal 600, and may be https://192.168.0.2:9999/aaa/aaa as in the drawing. In this case, 9999 may represent the port.

Figure 14B:
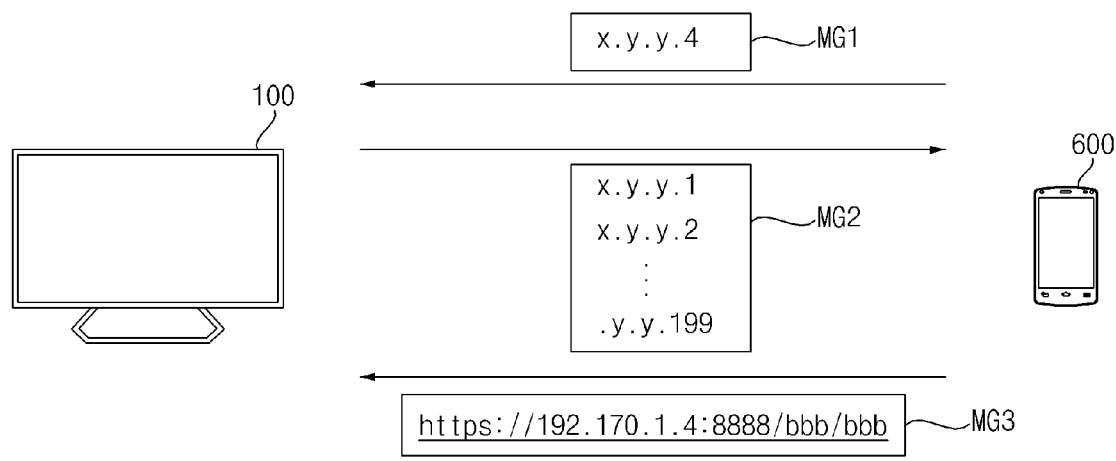

FIG. 14B is a diagram illustrating various examples of a signal between the mobile terminal 600 and the image display apparatus 100.

Referring to the drawing, a second network address MG1 of the mobile terminal 600 received in step S653 of FIG. 12 may be exemplified as y.y.y.4 as in the drawing.

The signal processing device 170 of the image display apparatus 100 generates a certificate MG2 and a security key based on the second network address MG1 of the mobile terminal 600.

Meanwhile, when the second network address MG1 of the mobile terminal 600 is y.y.y.4, a plurality of network addresses in the certificate MGb may include y.y.y.1 to y.y.y.199.

Next, the mobile terminal 600 may execute the second server based on the received second certificate and security key, and transmit a second server address MG3 of the executed second server to the image display apparatus 100.

In this case, the second server address MG3 may include the second network address MG1 of the mobile terminal 600, and may be https://192.170.1.4:8888/bbb/bbb as in the drawing. In this case, 888 may represent the port.

Meanwhile, the network interface 135 in the image display apparatus 100 may receive, after transmitting the generated second certificate and second security key, the second server address of the second server executed by the mobile terminal 600, access the server of the mobile terminal 600 based on the second server address, and receive a second content from the mobile terminal 600.

Figure 14C:
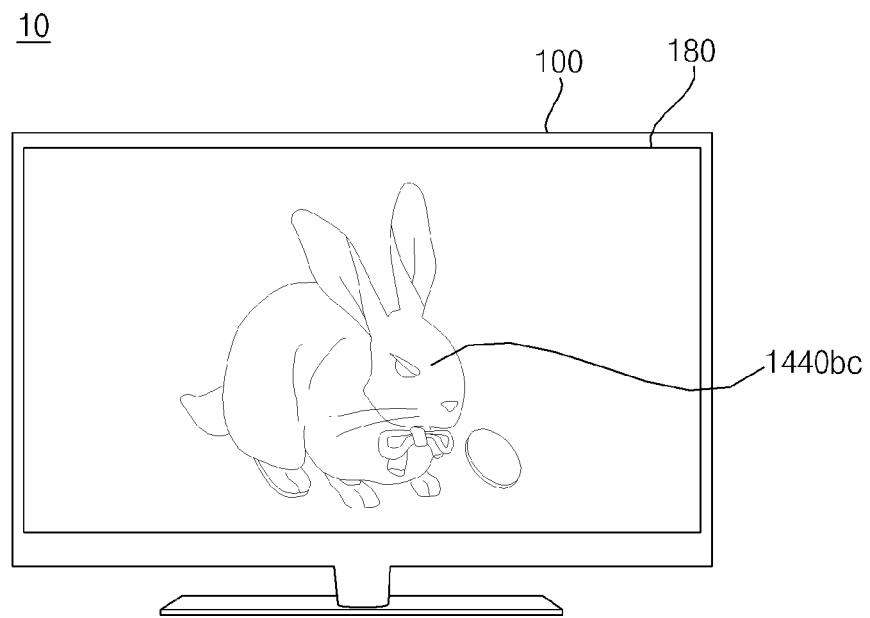
Figure 14C:
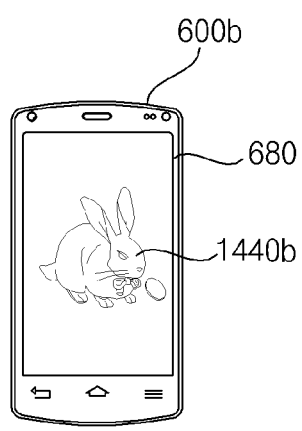
Figure 15:
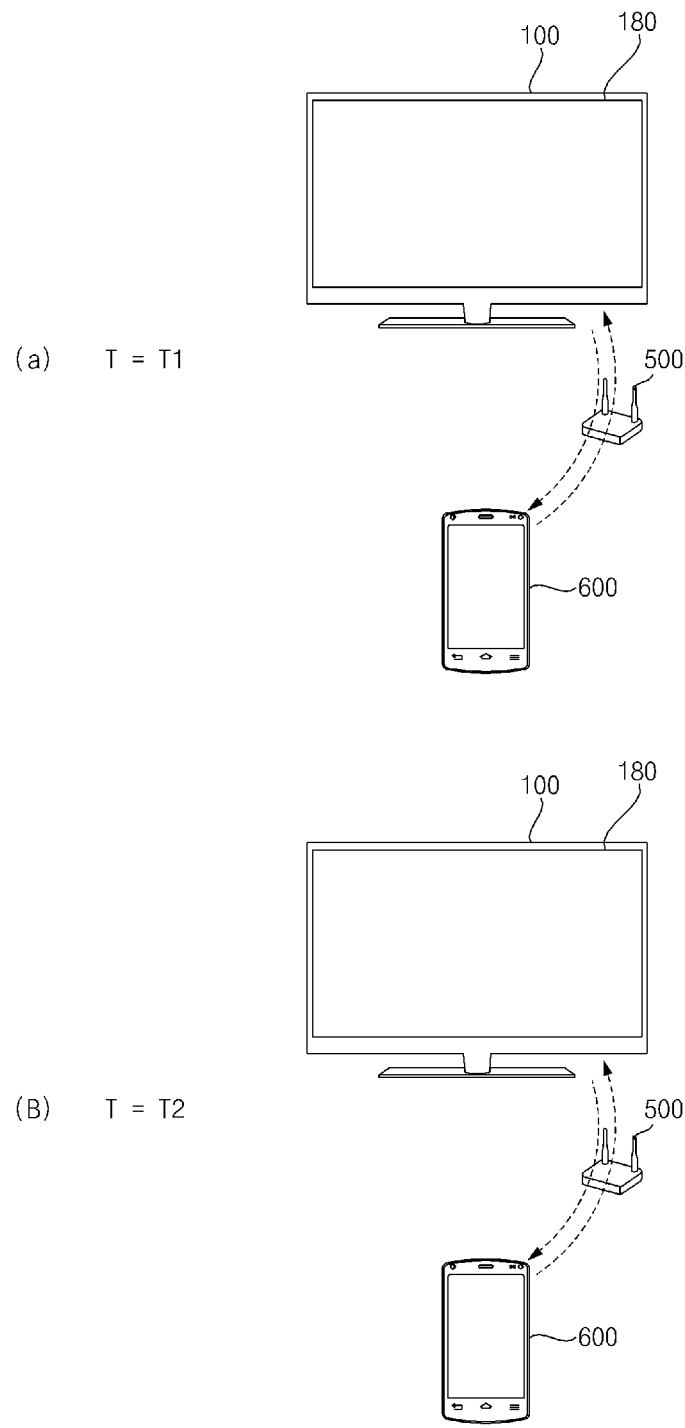

FIG. 14C is a diagram illustrating sharing a second content between the image display apparatus 100 and the mobile terminal 600.

Referring to the drawing, as illustrated in FIG. 10C, after a first sharing content image 840bc is displayed in the display 180, the mobile terminal 600 shares the second content to control a second sharing content image 1440bc to be displayed in the display 180.

Meanwhile, when a sharing item of the second content displayed in the display 180 is selected or when the sharing application is executed, the controller 670 of the mobile terminal 600 may be configured to, after executing the server, transmit a second connection request and a second network address to the image display apparatus 100, receive a second certificate and a second security key received from the image display apparatus 100, and execute a second server for sharing the second content.

Meanwhile, the controller 670 may be configured to, after executing the server, transmit the second connection request and the second network address to the image display apparatus 100 when the sharing item of the second content displayed in the display 180 is selected or when the sharing application is executed, and execute the second server for sharing the second content again when the certificate and the security key are received from the image display apparatus 100 again or the certificate and the security key are not received for a predetermined time.

Meanwhile, the controller 670 of the mobile terminal 600 may be configured to transmit the displayed second image 1440b to the image display apparatus 100 as the second server is executed.

In response thereto, the signal processing device 170 of the image display apparatus 100 may be configured to the received second sharing content image 1440bc to be displayed in the display 180.

FIG. 15A illustrates that the first content is shared between the mobile terminal 600 and the image display apparatus 100 at a first time T1.

That is, the sharing may correspond to step S610 to S640 of FIG. 12.

FIG. 15B illustrates that the second content is shared between the mobile terminal 600 and the image display apparatus 100 at a second time T2 at the first time T1.

That is, the sharing may correspond to steps S640 to S680. Accordingly, the second content may be conveniently shared between the image display apparatus 100 and the mobile terminal 600 based on the dynamically generated second certificate.

Although preferred embodiments of the present disclosure have been illustrated and described above, the present disclosure is not limited to the specific embodiments described above, various modifications can be made by those skilled in the art to which the invention pertains without departing from the gist of the present disclosure claimed in claims, and these modified embodiments should not be individually understood from the technical idea or perspective of the present disclosure.

What is claimed is:

1. An image display apparatus comprising
a display;
a signal processing device configured to output an image signal to the display; and
an interface configured to exchange data with a mobile terminal or a server,
wherein the interface receives a connection request and a network address of the mobile terminal from the mobile terminal, and
the signal processing device is configured to generate a certificate and a security key based on the network address of the mobile terminal, and transmit the generated certificate and security key to the mobile terminal.

2. The image display apparatus of claim 1, wherein after transmitting the generated certificate and security key, the interface receives, a server address of a server executed by the mobile terminal, accesses the server of the mobile terminal based on the server address, and receives a content from the mobile terminal.

3. The image display apparatus of claim 2, wherein the signal processing device is configured to display the content on the display after receiving the content from the mobile terminal.

4. The image display apparatus of claim 2, wherein the signal processing device is configured to display content reception information after receiving the content from the mobile terminal.

5. The image display apparatus of claim 2, wherein the server executed by the mobile terminal includes a hypertext transfer protocol secure server.

6. The image display apparatus of claim 1, wherein the signal processing device generates the certificate including a plurality of network addresses including the network address of the mobile terminal.

7. The image display apparatus of claim 6, wherein in response to the signal processing device receiving a second network address included in the plurality of network addresses from the mobile terminal after transmitting the generated certificate and security key to the mobile terminal, the signal processing device is configured to transmit the pre-generated certificate and security key to the mobile terminal.

8. The image display apparatus of claim 6, wherein in case in which the signal processing device transmits the generated certificate and security key to the mobile terminal, receives the server address of the server executed by the mobile terminal, and then receives the second network address included in the plurality of network addresses from the mobile terminal, the signal processing device is configured to access the server of the mobile terminal based on the server address of the server without additional transmission of the certificate and the security key to the mobile terminal, and receive the content from the mobile terminal.

9. The image display apparatus of claim 6, wherein in case in which the signal processing device transmits the generated certificate and security key to the mobile terminal, and then receives a second network address not included in the plurality of network addresses from the mobile terminal, the signal processing device is configured to generate a second certificate and a second security key based on the second network address of the mobile terminal, and transmit the generated second certificate and second security key to the mobile terminal.

10. The image display apparatus of claim 9, wherein after transmitting the generated second certificate and security key, the interface receives a second server address of a second server executed by the mobile terminal, accesses the server of the mobile terminal based on the second server address, and receives a second content from the mobile terminal.

11. The image display apparatus of claim 6, wherein in case in which the signal processing device transmits the generated certificate and security key to the mobile terminal, and then receives a second connection request and a second network address from a second mobile terminal, the signal processing device is configured to generate the second certificate and the second security key based on the second network address of the second mobile terminal, and transmit the generated second certificate and second security key to the second mobile terminal.

12. The image display apparatus of claim 11, wherein the interface receives, after transmitting the generated second certificate and second security key, a second server address of a second server executed by the second mobile terminal, accesses the server of the second mobile terminal based on the second server address, and receives a second content from the second mobile terminal.

13. A mobile terminal comprising:
a display;
a controller configured to output an image signal to the display; and
a wireless transceiver configured to exchange data with an image display apparatus,
wherein in response to a sharing item of a content displayed on the display being selected or in response to a sharing application being executed, the controller is configured to transmit a connection request and a network address to the image display apparatus, receive a certificate and a security key received from the image display apparatus, and execute a server for sharing the content.

14. The mobile terminal of claim 13, wherein the controller is configured to transmit the server address to the image display apparatus after executing the server, and transmit the content to the image display apparatus based on the server access in the image display apparatus.

15. The mobile terminal of claim 13, wherein in response to a sharing item of a second content displayed on the display being selected or in response to the sharing application being executed after executing the server, the controller is configured to transmit a second connection request and a second network address to the image display apparatus, receive a second certificate and a second security key received from the image display apparatus, and execute a second server for sharing the second content.

16. The mobile terminal of claim 13, wherein in response to the sharing item of the second content displayed on the display being selected or in response to the sharing application being executed after executing the server, the controller is configured to transmit the second connection request and the second network address to the image display apparatus, and
wherein the controller is configured to execute the second server for sharing the second content again in response to the certificate and the security key being received from the image display apparatus again or the certificate and the security key being not received for a predetermined time.

17. The mobile terminal of claim 13, wherein the server includes a hypertext transfer protocol secure server.

18. An image system comprising:
an image display apparatus; and
a mobile terminal,
wherein the image display apparatus comprises:
a display;
a signal processing device configured to output an image signal to the display; and
an interface configured to exchange data with a mobile terminal or a server,
wherein the interface receives a connection request and a network address of the mobile terminal from the mobile terminal, and
the signal processing device is configured to generate a certificate and a security key based on the network address of the mobile terminal, and transmit the generated certificate and security key to the mobile terminal.

19. The image system of claim 18, wherein in response to a sharing item of a content displayed on a display of the mobile terminal being selected or in response to a sharing application being executed, the mobile terminal is configured to transmit a connection request and a network address to the image display apparatus, receive a certificate and a security key received from the image display apparatus, and execute a server for sharing the content.

\* \* \* \* \*